US012780250B2

(12) United States Patent
Lorenzetti et al.

(10) Patent No.: US 12,780,250 B2
(45) Date of Patent: Nov. 3, 2026

(54) HIERARCHICAL MULTI-OBJECTIVE OPTIMIZATION IN VEHICLE PATH PLANNING TREE SEARCH

(71) Applicant: Zoox, Inc., Foster City, CA (US)

(72) Inventors: Joseph Lorenzetti, Foster City, CA (US); Timothy Caldwell, Boulder, CO (US); Ke Sun, Foster City, CA (US); Xianan Huang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 450 days.

(21) Appl. No.: 18/217,187

(22) Filed: Jun. 30, 2023

(65) Prior Publication Data

US 2025/0002041 A1 Jan. 2, 2025

(51) Int. Cl.
*B60W 60/00* (2020.01)

(52) U.S. Cl.
CPC .... *B60W 60/0011* (2020.02); *B60W 60/0013* (2020.02); *B60W 60/0015* (2020.02)

(58) Field of Classification Search
CPC ......... B60W 60/0011; B60W 60/0013; B60W 60/0015
See application file for complete search history.

(56) References Cited

U.S. PATENT DOCUMENTS

| | | | | |
|---|---|---|---|---|
| 9,248,834 | B1 * | 2/2016 | Ferguson | B60W 30/09 |
| 10,649,459 | B2 | 5/2020 | Wang | |
| 11,231,481 | B1 | 1/2022 | Cohen | |
| 11,338,825 | B2 | 5/2022 | Bagschik | |
| 11,541,909 | B1 | 1/2023 | Poubel Orenstein | |
| 2014/0365544 | A1 * | 12/2014 | Moffitt | G06F 17/11 708/207 |
| 2023/0041975 | A1 * | 2/2023 | Caldwell | B60W 60/0027 |

FOREIGN PATENT DOCUMENTS

| | | | |
|---|---|---|---|
| CN | 114995415 | A | 5/2024 |
| EP | 2169500 | B1 | 3/2010 |
| JP | 2020502481 | A | 4/2022 |
| KR | 20210061461 | A | 5/2021 |

OTHER PUBLICATIONS

Wray, et al., "Multi-objective MDPs with conditional lexicographic reward preferences", In: Twenty-ninth AAAI conference on artificial intelligence. 2015. 14 pages.
Search Report and Written Opinion for International Application No. PCT/US24/34590, Dated Oct. 15, 2024, 11 pages.
U.S. Appl. No. 16/581,632, filed Sep. 24, 2019.
U.S. Appl. No. 17/184,559, filed Feb. 24, 2021.

* cited by examiner

*Primary Examiner* — Anne Marie Antonucci
*Assistant Examiner* — Jewel A Kuntz
(74) *Attorney, Agent, or Firm* — Lee & Hayes, P.C.

(57) ABSTRACT

A hierarchical tree search may determine different costs associated with a same candidate action for different levels of the hierarchy, each of which may be associated with different cost function(s) and respective objective(s), such as safety, progress, comfort, and the like. At each level, the hierarchical tree search may determine an upper and lower bound cost for the candidate action that may be based on the cost function(s) for that level. The hierarchical tree search may mask out for subsequent level(s) any candidate actions at a level of the tree that exceed the lowest upper or lower bound cost of any candidate action at that level by more than a slack amount.

20 Claims, 8 Drawing Sheets

HIERARCHICAL MULTI-OBJECTIVE OPTIMIZATION IN VEHICLE PATH PLANNING TREE SEARCH

BACKGROUND

An autonomous vehicle may fail to navigate accurately and/or efficiently when normative operating conditions are altered, such as when roadway indicators are obscured (e.g., by snow, garbage, sand), degraded (e.g., burned out light, worn out lane markings), and/or invalidated (e.g., an obstruction partially blocks a lane, traffic signage and/or traffic cones indicate an alternate lane that conflicts with original lane markings). Moreover, various environmental factors and human and animal behavior may be erratic or unpredictable, which may further make autonomous vehicle navigation difficult.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
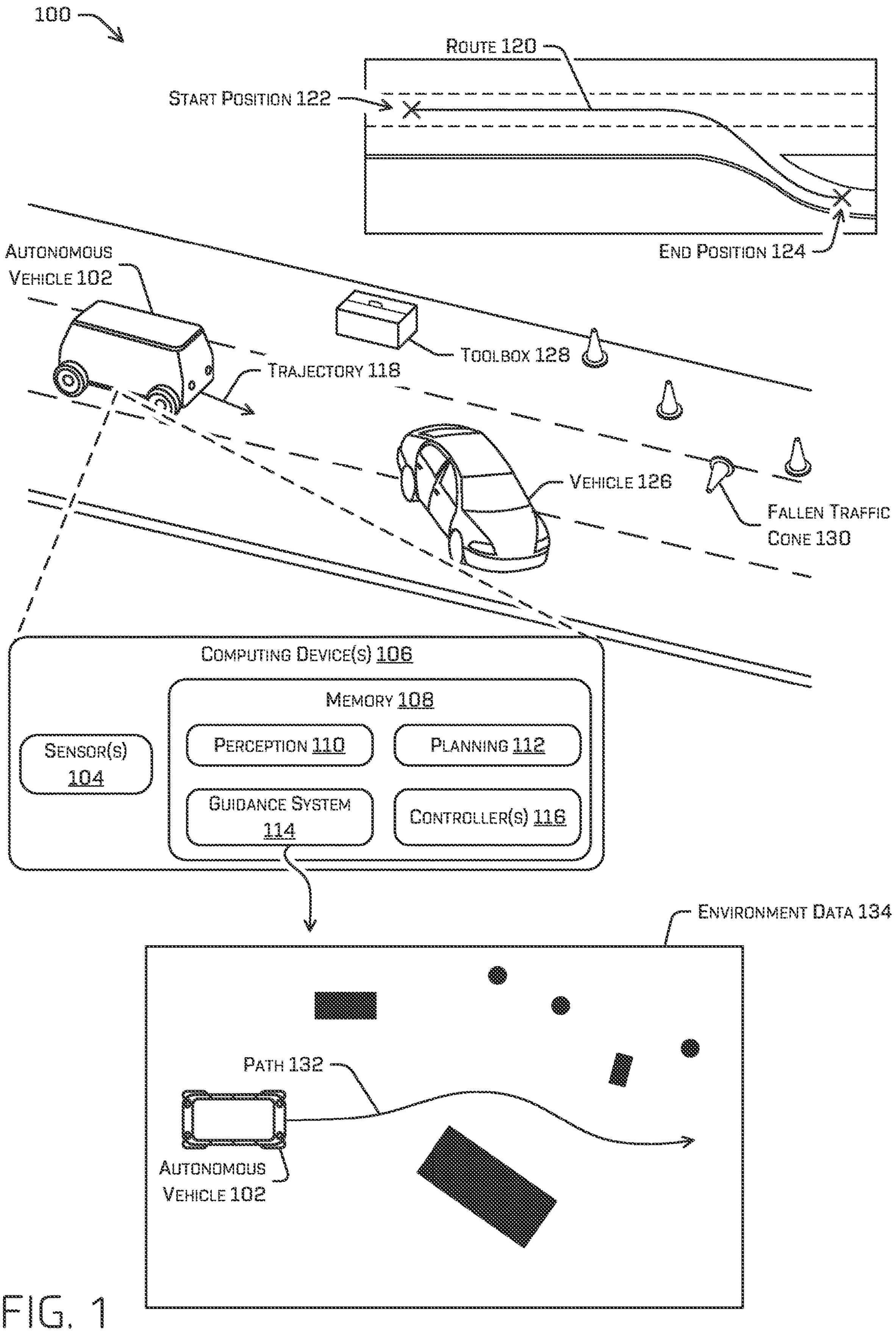
FIG. 1 illustrates an autonomous vehicle and an example scenario in which lane references (whether previously mapped or detected) may not be reliable for determining instructions for controlling motion of the vehicle.

As discussed above, it may be difficult to prepare an autonomous vehicle for all contingencies because of the occurrence of anomalous behavior and variances in road conditions. These situations may cause the autonomous vehicle to stutter or hesitate, stop completely when a human driver would be able to navigate the situation, and/or need to transmit a request for help from a remote operator (or "teleoperator"). This application relates to techniques for increasing the number of scenarios the autonomous vehicle can safely and efficaciously navigate, e.g., without stopping, without stuttering, without the need to request help from a teleoperator, and/or decreasing a likelihood of an impact occurring, particularly for aberrant circumstances but also for normative driving conditions. For example, the techniques discussed herein may decrease the occurrence of autonomous vehicle stops or stutters for normative situations such as traffic cones that have been knocked into the middle of a lane, when an object such as a vehicle is blocking part of two lanes, trash laying in the street, complex junctions with multiple vehicles and pedestrians, navigating in a gravel area with no lane markings, etc.

The techniques (e.g., hardware, software, systems, and/or processes) discussed herein may include an autonomous vehicle guidance system that generates a path for controlling an autonomous vehicle based at least in part on a tree search technique that alternately determines a candidate action and predicts a future state of the environment associated with the autonomous vehicle responsive to the candidate action. The tree search may determine an action for the vehicle to carry out based at least in part on determining costs associated with different candidate actions and selecting one of the candidate actions based on a cost associated therewith from among the multiple candidate actions and their respective costs.

However, linear scalarization, a technique used to combine different sub-costs that make up a cost determined for a candidate action may be prone to causing regression in higher priority objectives in exchange for improving lower-priority objectives. For example, in order to achieve a lowest total cost, linear scalarization may result in sacrificing safety to increase the comfort for a passenger or progress that the vehicle makes. Weights may be used to correct this deficiency, but even then, outlier situations may still cause linearly scalarized costs to result in an adverse outcome. Moreover, using weights requires an inordinate amount of fine-tuning, which can be machine-tuned, but may require human oversight and/or further modification. Increasing a weight to heavily prioritize a particular objective may also amplify the amount of noise in simulator and cost evaluation, which may result in instable and erratic behavior of the vehicle.

The techniques discussed herein include hierarchical cost determination for a candidate action, that conserves the amount of regression in higher priority objectives permissible for determining a candidate action that will control the vehicle. This hierarchical tree search may break the cost determination into different hierarchical levels in order of priority. For example, a first level of the hierarchical cost determination may be associated with object impact and/or safety of the vehicle, a second level may be associated with vehicle progress and/or passenger comfort, a third level may be associated with driving dynamics, and so on. Each level may be associated with one or more objectives and a particular objective may have one or more cost functions associated therewith. For example, a safety objective may be associated with multiple different sub-costs that may be based at least in part on the proximity to an object that a candidate action would bring the vehicle, minimum braking distance or maximum braking force to a nearest object, conformance to rules of the road, and/or the like. A passenger comfort objective may be associated with determining an acceleration or jerk associated with the candidate action and/or one or more lateral and/or longitudinal velocity, acceleration, and/or jerk thresholds.

The techniques may include determining a cost for a candidate action, which may be associated with a corresponding action node in the tree search, and/or a prediction node. The prediction node may indicate a predicted state of the vehicle and/or the environment that would result from the vehicle carrying out the candidate action. In some examples, the prediction node may be based at least in part on sensor data and/or a previous prediction node if the prediction node is in a layer of prediction nodes beyond a first layer of prediction nodes. The techniques may include determining first costs for multiple action nodes and their corresponding prediction nodes for a first level of the hierarchy using a first cost function (or multiple cost functions in examples where the first level is associated with multiple objectives). The cost may be based at least in part on the candidate action itself and/or the state indicated by the prediction node. In some examples, for the first level, the techniques may determine the lowest (first) cost candidate action from among the multiple first costs and action nodes or a candidate action that is associated with a first cost that is below a threshold first cost. The techniques may include masking out (making unavailable for selection) any action nodes and/or prediction nodes that are associated with first cost(s) that are more than a threshold difference from the first cost associated with the candidate action selected for the first level. This threshold difference is also called a slack herein and may also be an adaptive slack that includes both a static slack plus the difference between an upper bound first cost and a lower bound first cost associated with the candidate action, as discussed in more detail herein.

For the second level, the techniques may include determining second costs associated with the remaining action nodes and/or prediction nodes that haven't been masked out using second cost function(s) that are associated with the second objective(s). The techniques may determine a candidate action, from among the unmasked candidate actions, that is associated with a lowest second cost from among the multiple second costs. In examples where candidate actions haven't previously been masked or to verify the validity of the candidate action, the techniques may determine a difference between a first level cost of the candidate action determined at the second level and a first level cost of the candidate action determined at the first level. If this difference is less than the threshold difference, the candidate action determined at the second level may be used or passed to a next level of the hierarchical tree search. In some examples, a second threshold difference may be associated with the second level and any candidate actions associated with second costs that exceed the threshold difference plus the cost of the candidate action determined at the second level may be masked. This process may be repeated until a final level is reached.

In some examples, to avoid needing to determine the actual optimal (lowest cost) candidate action at each level, an upper bound cost and a lower bound cost may be determined for a candidate action and the differences discussed herein may be based at least in part on a difference between the range between the upper bound cost and the lower bound cost associated with a candidate action and another range associated with another candidate action, or between the upper bound cost associated with a candidate action and the upper bound cost associated with a different candidate action.

To give a practical example, a first level may be associated with safety and avoiding an object impact. Safety may be differentiated from object impact avoidance since maneuvers may still be considered unsafe/too risky (e.g., associated with a low confidence score in avoiding object impact) even if they aren't predicted to impact an object. A first level cost (e.g., upper and lower bound cost) may be determined for up to each candidate action based on totally a safety sub-cost function and an object impact avoidance impact sub-cost function. The techniques may determine a first candidate action associated with a lowest range, lowest upper bound first level cost, a range that is less than a threshold range, or an upper bound cost that is below an upper bound first level cost threshold. Any candidate action associated with a first level cost that meets or exceeds the first level cost of the selected first candidate action plus a first slack amount (e.g., a threshold difference or difference amount) or first adaptive slack amount may be masked out, preventing consideration of those candidate action(s) in subsequent level(s).

A second level may be associated with progress and may comprise determining a second level cost for up to each of the remaining candidate action(s) after the masking at the first level. The techniques may determine a candidate action (e.g., either the first candidate action or another candidate action) associated with a lowest range, lowest upper bound second level cost, a range that is less than a threshold range, or an upper bound cost that is below an upper bound second level cost threshold. If this is the last level of the hierarchy, this candidate action may be used to control the vehicle, although in examples where further levels exist in the hierarchy, any candidate action that has a second level cost of the candidate action selected at the second level plus a second slack amount or second adaptive slack amount may be masked out. The slack or adaptive slack amount may be the same or differ between levels. This process may be repeated until a final level in the hierarchical tree search costing is reached.

In some examples, the techniques discussed herein may associate and maintain an upper bound cost and a lower bound cost with an action node and/or prediction node for up to the duration of the tree search. In some examples, a running total upper bound and/or lower bound for a path through a respective branch through action nodes and prediction nodes may be determined to reflect the total upper bound cost and lower bound cost of each level's costs for that path through the tree. For example, a first running total of upper bound and lower bound first costs associated with a first level may be determined in reaching a specific action node and/or or prediction node in the tree and a second running total of upper bound and lower bound second costs associated with a second level may be determined in reaching a specific action node and/or prediction node in the tree. In some examples, the first running total and/or the second running total may be associated with the specific action node and/or prediction node. In some examples, a regret may be associated with a specific action node, which may indicate a total difference between the running total upper or lower bound cost associated with a specific node and the original upper or lower bound cost associated with a root node or first node in the tree. If this total difference meets or exceeds the threshold difference, the path may be indicated as being invalid. In some examples, the slack amount or adaptive slack amount for a particular level may be discounted based at least in part on a total number of levels, such that the total difference must not be greater than the slack amount or adaptive slack amount, or, in another example, the slack amount or adaptive slack amount may not be discounted for a particular level.

The techniques discussed herein may increase the safety of operation of a vehicle employing the hierarchical tree search costing techniques discussed herein by limiting the amount of regression in a higher priority objective permitted by the techniques. Moreover, the techniques may increase the artificial intelligence of the vehicle in operating at or better than human performance standards. The techniques may also reduce the amount of hardware and/or compute time needed for running operations of the techniques by masking out candidate action(s) that exceed a slack or adaptive slack amount and because the techniques do not require the process at a particular level to converge before proceeding to a next level. Furthermore, the techniques discussed herein reduce the amount of weight tuning and validation required to ensure safe and effective operation of a vehicle that employs the techniques discussed herein, further liberating the techniques discussed herein from human involvement. For example, the hierarchical tree search with slack or adaptive slack does not require cross-tuning weights between levels of the hierarchy. The techniques also avoid amplifying noise in the cost estimation and prediction node generation, reducing erratic behavior by the vehicle that may result from this amplified noise.

EXAMPLE SCENARIO

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, aircraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, guidance system 114, and/or controller(s) 116. In some examples, the planning component 112 may comprise the guidance system 114. In some examples, the perception component 110 may include a simultaneous localization and mapping (SLAM) component.

In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or a path generated by the guidance system 114. The trajectory 118 may be one of the candidate actions determined by the guidance system 114. In some examples, the perception component 110 may comprise a pipeline of hardware and/or software, which may include one or more GPU(s), ML model(s), Kalman filter(s), and/or the like.

The trajectory 118 may comprise instructions for controller(s) 116 of the autonomous vehicle 102 to actuate drive components of the vehicle 102 to effectuate a steering angle and/or steering rate, which may result in a vehicle position, vehicle velocity, and/or vehicle acceleration that tracks the path generated by the guidance system. For example, the trajectory 118 may comprise a target heading, target steering angle, target steering rate, target position, target velocity, and/or target acceleration for the controller(s) to track as part of the path. For example, the coarse path generated by the guidance system 114 according to the techniques discussed herein may indicate vehicle positions, headings, velocities, and/or entry/exit curvatures at 500 millisecond time intervals and a smooth path output by the guidance system 114 may comprise such points at a 10 or 100 millisecond interval, which may correspond to a time interval associated with the trajectory 118. In some examples, the controller(s) 116 may comprise software and/or hardware for actuating drive components of the vehicle 102 sufficient to track the trajectory 118 (and/or path, which may comprise multiple trajectories in one example). In some examples, the trajectory 118 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). In some examples, the trajectory 118 may be a first action in a sequence of actions that make up a path generated by the guidance system 114.

In some examples, the perception component 110 may receive sensor data from the sensor(s) 104 and determine data related to objects in the vicinity of the vehicle 102 (e.g., classifications associated with detected objects, instance segmentation(s), semantic segmentation(s), mask(s), two and/or three-dimensional bounding boxes or other region(s) of interest, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 110 may determine, based at least in part on sensor data, an object detection indicating an association of a portion of sensor data with an object in the environment. The object detection may indicate an object classification, sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, and/or sensor data segmentation is correct/accurate (there may be confidence score generated for each in some examples). For example, the ROI may include a portion of an image, lidar, and/or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical, current, and/or predicted object position, orientation, velocity, acceleration, and/or other state (e.g., door state, turning state, intent state such as signaling turn) of that object. The predicted portion of a track may be determined by a prediction component, in some examples.

In some examples, the perception component 110 may additionally or alternatively determine a likelihood that a portion of the environment is occluded to one or more sensors and/or which particular sensor types of the vehicle. For example, a region may be occluded to a camera but not to radar or, in fog, a region may be occluded to the lidar sensors but not to cameras or radar to the same extent.

The data produced by the perception component 110 may be collectively referred to as perception data. Once the perception component 110 has generated perception data, the perception component 110 may provide the perception data to a prediction component (unillustrated in FIG. 1 but illustrated in FIG. 2) and/or the planning component 112. The perception data may additionally or alternatively be stored in association with the sensor data as log data. This log data may be transmitted to a remote computing device (unillustrated in FIG. 1 for clarity) for use as at least part of training and/or validation data.

In some examples, the prediction component may receive sensor data and/or perception data and may determine a predicted state of dynamic objects in the environment. In some examples, dynamic objects may include objects that move or change states in some way, like traffic lights, moving bridges, train gates, and the like. The prediction component may use such data to a predict a future state, such as a signage state, position, orientation, velocity, acceleration, or the like, which collectively may be described as prediction data.

The planning component 112 may use the perception data received from perception component 110 and/or prediction data received from the prediction component, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories (and/or determine differing periods of time to follow portions of the potential trajectories) as a trajectory 118 of the vehicle 102 that may be used to generate a drive control signal that may be transmitted to drive components of the vehicle 102. In another example, the planning component 112 may select the trajectory 118 using the guidance system 114 configured according to the hierarchical tree search costing techniques discussed herein. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

In some examples, the controller(s) 116 may comprise software and/or hardware for actuating drive components of the vehicle 102 sufficient to track the trajectory 118. For example, the controller(s) 116 may comprise one or more proportional-integral-derivative (PID) controllers to control vehicle 102 to track trajectory 118.

In the example scenario 100, the autonomous vehicle 102 has received and/or determined a route 120 defining a start position 122, an end position 124, and a curve between the start position 122 and the end position 124 (note that the curve comprises a straight line and/or one or more curves). For example, the planning component 112 may have determined the route 120 based at least in part on sensor data and an end position received as part of a mission (e.g., from a passenger, from a command center). As used herein, references to a "position" may comprise both a location and/or a pose (e.g., position and/or orientation/heading of the vehicle). In some examples, the route may not comprise end position 124 and may additionally or alternatively comprise a target position, such as a target lane, target relative position (e.g., 10 feet from roadway edge), target object (e.g., follow vehicle, follow passenger, move toward an individual hailing the vehicle), etc.

As the vehicle operates to reach the end position 124, the autonomous vehicle 102 may encounter a scenario like example scenario 100 in which a planner that is reliant on a lane reference (e.g., a relative spatial designation determined based at least in part on a map and/or localizing the autonomous vehicle 102) to generate a path may not accurately and/or efficiently generate a path. For example, a variety of objects (e.g., a blocking vehicle 126, toolbox 128, and fallen traffic cone 130) cumulatively block all three lanes of the depicted roadway, which may cause another planner to stop the vehicle and/or call teleoperations because no one lane has sufficient room for the autonomous vehicle.

However, the guidance system 114 discussed herein may generate a path 132 based at least in part on environment data 134 generated from sensor data captured by sensor(s) 104. For example, the perception component 110 may generate all or part of environment data 134, which may comprise static data and/or dynamic data. For example, the static data may indicate a likelihood that an object exists at a location in the environment and the dynamic data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted). In some examples, the guidance system 114 may always run, i.e., the guidance system may be the nominal planning component, or, in an alternate example, the guidance system 114 may be a contingent planning component or a planning component for special circumstances (e.g., when a nominal planning component isn't able to find a valid path). In some examples, the guidance system 114 may comprise a Kalman filter, ML model, or the like for determining prediction nodes for the tree search discussed herein. The memory 108 may additionally or alternatively store one or more canonical candidate actions for controlling the vehicle and these canonical candidate actions may be used as part of the candidate actions explored by the tree search. Canonical candidate actions may include “typical” actions, such as maintaining a previous trajectory of the vehicle, executing a left or right lane merge trajectory, executing a left or right turn, braking to a stop, accelerating to a maximum legal limit, a trajectory that is parallel with a current or next lane reference, and/or the like. In additional or alternate examples, the guidance system 114 may determine additional or alternate candidate actions that may vary from the canonical candidate actions where these additional or alternate candidate actions may be based at least in part on sensor data and/or environment data 134. In some examples, canonical or additional candidate actions may be screened out based at least in part on the environment data 134, such as those candidate actions that would overlap with space (currently or predicted to be) occupied by a dynamic object or static object.

In some examples, the guidance system 114 may comprise one or more CPUs, GPUs, and/or tensor processing units (TPUs), part thereof, or may be communicatively coupled with one or more CPUs, GPUs, and/or TPUs (e.g., via a publish-subscribe messaging system, via a data bus) and the techniques discussed herein may be parallelized and disseminated to threads of the GPUs, although it is contemplated that the techniques discussed herein may comprise at least portions that are serial.

EXAMPLE SYSTEM

Figure 2:
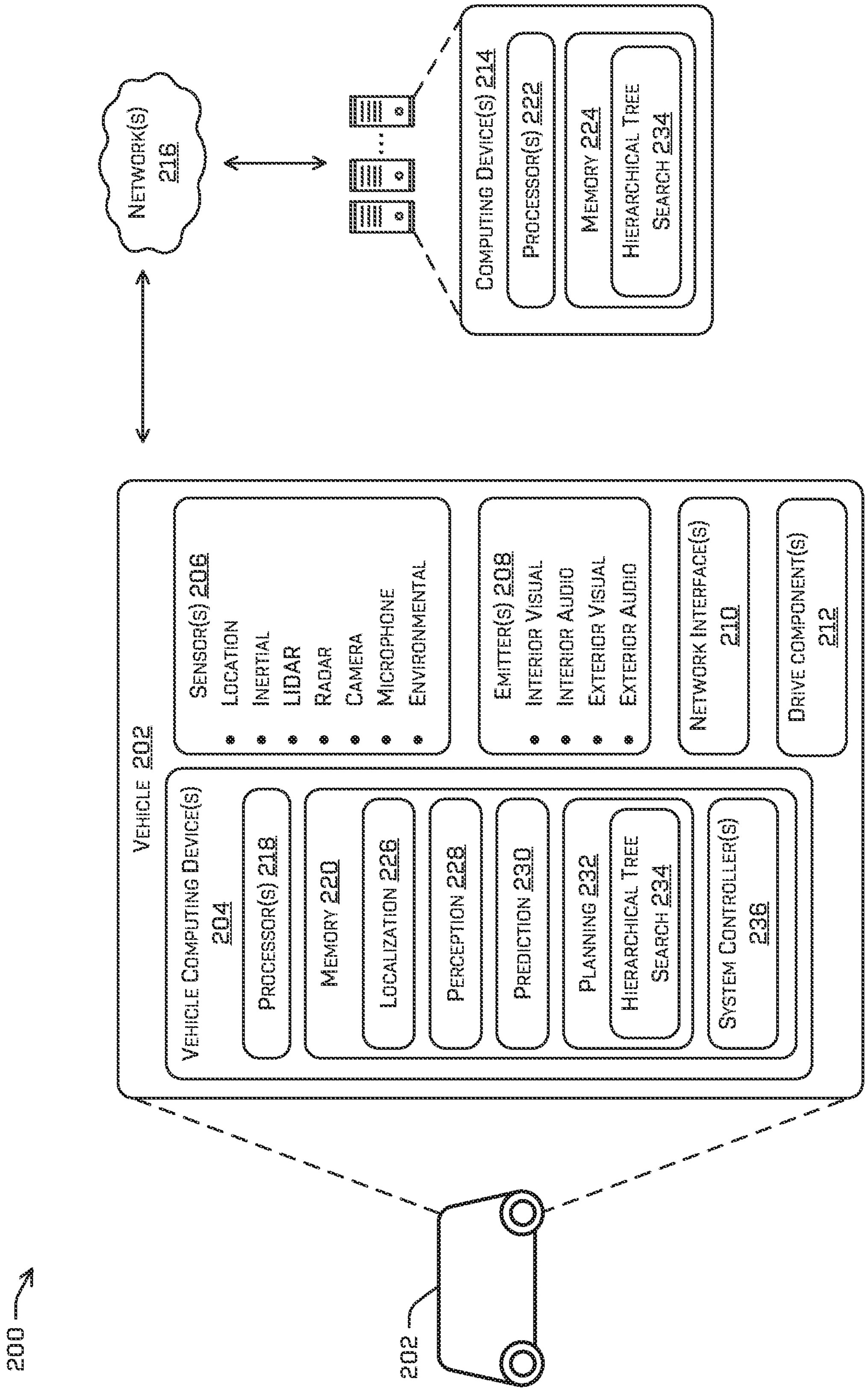
FIG. 2 illustrates a block diagram of an example autonomous vehicle architecture comprising a guidance system for vehicle path planning comprising a hierarchical tree search.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as ultra-high frequency (UHF) radio waves (e.g., Wi-Fi, satellite communication, Bluetooth®), cellular communication (e.g., 2G, 3G, 4G, 4G LTE, 5G, etc.), or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s)

212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, hierarchical tree search component 234, and/or system controller(s) 236—zero or more portions of any of which may be hardware, such as GPU(s), CPU(s), TPU(s), and/or other processing units. Perception component 228 may represent perception component 110, planning component 232 may represent planning component 112, the hierarchical tree search component 234 may be part of guidance system 114, and/or system controller(s) 236 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment (which may be stored in or streamed to memory 220), and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like In some instances, the localization component 226 may provide data to various components of the vehicle 202 to determine an initial position of an autonomous vehicle for generating a trajectory and/or for generating map data. In some examples, localization component 226 may provide, to the perception component 228, prediction component 230, and/or hierarchical tree search component 234 a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The perception component 228 may include a prediction component that predicts actions/states of dynamic components of the environment, such as moving objects, although the prediction component may be separate, as in the illustration. The prediction component 230 may predict a future state of an object in the environment surrounding the vehicle 202. For example, the future state may indicate a predicted object position, orientation, velocity, acceleration, and/or other state (e.g., door state, turning state, intent state such as signaling turn) of that object. In some examples, the perception component 228 may determine a top-down representation of the environment that encodes the position(s), orientation(s), velocity(ies), acceleration(s), and/or other states of the objects in the environment. For example, the top-down representation may be an image with additional data embedded therein, such as where various pixel values encode the perception data discussed herein.

The planning component 232 may receive a location and/or orientation of the vehicle 202 from the localization component 226 and/or perception data from the perception component 228 and may determine instructions for controlling operation of the vehicle 202 based at least in part on any of this data. In some examples, the memory 220 may further store map data, which is undepicted, and this map data may be retrieved by the planning component 232 as part of generating the environment state data discussed herein. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, perception data and/or prediction data may be provided as input to the hierarchical tree search component 234. In an additional or alternate example, the hierarchical tree search component 234 may include a Kalman filter or other simple prediction component for determining a prediction node that may be used instead of the prediction data, although in another example, the prediction component 230 may determine prediction data for the hierarchical tree search component 234 to determine a prediction node.

In some examples, the planning component 232 may be a primary component for determining control instructions for the vehicle 202, such as during operation of the vehicle 202 in nominal conditions; however, the planning component 232 may further comprise and/or the vehicle 202 may additionally comprise separately from the planning component 232 a hierarchical tree search component 234. Hierarchical tree search component 234 may determine a trajectory and/or path for controlling the vehicle contemporaneously with the planning component 232, such as to determine a contingent trajectory and/or path for controlling the vehicle 202 when a trajectory determined by the planning component 232 fails to be generated (e.g., the planning component 232 can't determine a suitable trajectory that avoids objects) and/or that violates a comfort metric, such as a threshold acceleration and/or jerk, or a rule of the road. Additionally or alternatively, the hierarchical tree search component 234 may be the component by which the planning component 232 determines a trajectory or one or more trajectories (i.e., a path) for controlling the vehicle 202.

The hierarchical tree search component 234 may execute the tree search discussed herein and may manage determining the action node(s) and/or prediction node(s) of the tree search by transmitting a request for the planning component to generate candidate action(s) based at least in part on an environment determined in association with a prediction node. The hierarchical tree search component 234 may receive an initial state of the environment from the perception component 228 (i.e., in association with a root node of the tree search)—the hierarchical tree search component 234 may transmit this initial environment state to the planning component 232 and may receive one or more candidate actions from the planning component 232 that may be based at least in part on sensor data and/or an initial state of the environment. Additionally or alternatively, the hierarchical tree search component 234 may retrieve one or more canonical candidate actions from memory 220, which may include typical actions including maintaining a last action of the vehicle, executing a lane change, executing a turn, stopping, accelerating to a speed limit, and/or the like. The hierarchical tree search component 234 may transmit at least one of these one or more candidate actions to a simulation component of the hierarchical tree search component 234 and/or the prediction component 230, which may determine a predicted state of the environment that is based at least in part on the candidate action. Based on the results of the simulation and/or prediction, the hierarchical tree search component 234 may determine a cost associated with a candidate action and may select a candidate action for exploration (exploring further candidate action(s) based on the selected candidate action) and/or for implementation. This process may be iterated until a time horizon, distance, progress along a route, target position, and/or suitable path is reached/determined.

For example, the time horizon may be a length of time into the future from a current time (e.g., 500 milliseconds, 1 second, 2, seconds, 5 seconds, 8 seconds, 10 seconds). This length of time may be associated with controlling the vehicle for the next m units of time, where m is a positive integer. A distance may define a total distance covered by the constituent actions that make up a path, whereas progress along a route may be the displacement along/with reference to a route. In an additional or alternate example, a target position may be used to terminate the tree search. For example, upon determining a path that reaches the target position in the environment, the tree search may output that path and terminate. In an additional or alternate example where the hierarchical tree search component may be used when a nominal planning component failed to create a valid trajectory or path, the hierarchical tree search component 234 may terminate upon determining a valid path (e.g., a path that is impact-free and conforms to a rule set, which may specify comfort metrics, conformance to laws). In additional examples, iterations may continue until an objective is achieved (e.g., a successful lane change, a successful merge, reaching an endpoint, or any other completed action). In any one or more examples, any combination of the above may further be used as decision points for branching the tree.

Ultimately, the tree search component 234 may determine a contiguous path through the sets of nodes that is associated with a lowest cost or a cost that is below a threshold cost. A contiguous path of action nodes is a set of nodes that are connected by a dependency in a data structure generated by the tree search. For example, the data structure may comprise a directed acyclic graph (DAG), Markov decision process (MDP), partially-observable MDP (POMDP), and/or the like. Intervening prediction nodes are not taken into account for the sake of path planning beyond the costs they may indicate. Two action nodes are dependent when they are connected by an intervening prediction node, which indicates that the lower-level action node starts from an end position of the higher-level action node.

The tree search may conduct a search for the path from the root node to a last layer of the data structure. Conducting the search may comprise determining a contiguous set of connections between nodes of the different sets of nodes from the root node to an action node in a deepest layer of the data structure. Determining the path may comprise searching for solutions in the multivariate space that maximize a combination of displacement along the route and lateral/azimuthal diversity among the solutions (or meet a diversity heuristic) and minimize cost based at least in part on the cost map in the time interval given. For example, the search algorithm may comprise an algorithm such as, for example D*, D*lite, Focused Dynamic A*, A*, LPA*, Dijkstra's algorithm, and/or the like, although other search algorithms for searching and/or generating a directed graph and/or a weighted directed graph may be used. In some examples, the search may be configured with a ruleset that may comprise one or more rules, e.g., specifying a boundary within which to determine the path (e.g., the boundary may be determined based at least in part on sensor data and/or a map), node connection rules (e.g., nodes may have only one parent node), and/or the like. In some examples, the search may comprise determining a directed graph between nodes of the sets of nodes. The directed graph may comprise a connection (e.g., edge) between a first node and a second node and/or weight (e.g., cost) associated with the connection.

A simulation component of the hierarchical tree search component 234 may determine a simulation of the environment and/or the vehicle 202, such as simulating execution of a candidate action by the vehicle 202 and a predicted state of the environment based at least in part on the passage of time, progress of the vehicle, and response to execution of the candidate action by the vehicle 202 by any dynamic object(s) in the environment. For example, the simulation may comprise a representation of a position, orientation, movement, and/or quality of portions of the environment and/or the vehicle 202. The environment may comprise an agent, such as another vehicle, a pedestrian, vegetation, a building, signage, and/or the like.

The simulation component may receive a candidate action and an environment state (which may be a current environment state determined by the perception component 228 or a predicted environment state determined by a prediction component of the perception component 228 or by the simulation component) from the hierarchical tree search component 234 to determine the simulation data, which may be a two or three-dimensional representation of the scenario. The simulation data may be used to instantiate and execute a simulation. The candidate action may be used to control motion of a simulation of the vehicle 202 during execution of the simulation. For example, the candidate action may be associated with an action node in the tree search. The simulation may be used to update a prediction node that is estimated to be responsive to the candidate action. A three-dimensional representation may comprise position, orientation, geometric data (e.g., a polygon representation, a digital wire mesh representation) and/or movement data associated with one or more objects of the environment and/or may include material, lighting, and/or lighting data, although in other examples this data may be left out. In an additional or alternate examples, the simulation component may comprise a computational construct (e.g., an algorithmic and/or mathematical representation used by a computing device in performing the operations described that is not intended to be (and/or incapable of being) visualized).

In some examples, the simulation may be instantiated based at least in part on scenario data. The scenario data may comprise a two-dimensional representation of an environment associated with a scenario, objects contained therein, and characteristics associated therewith, all of which may be part of a scenario associated with the log data. For example, the scenario data may identify a position of an object, an area occupied by the object, a velocity and/or acceleration associated with the object, whether the object is static or dynamic, an object type associated with the object (e.g., a classification such as "pedestrian," "bicyclist," "vehicle," "oversized vehicle," "traffic light," "traffic signage," "building," "roadway," "crosswalk, "sidewalk"), and/or other kinematic qualities associated with the object and/or the object type (e.g., a friction coefficient, an elasticity, a malleability). As regards the environment itself, the scenario data may identify a topology of the environment, weather conditions associated with the environment, a lighting state (e.g., sunny, cloudy, night), a location of light sources, and/or the like. In some examples, topology, fixed object (e.g., buildings, trees, signage) locations and dimensions, and/or the like associated with the scenario data may be generated based at least in part on map(s). In some examples, the scenario data may be used (e.g., by the simulation component) to instantiate a three-dimensional representation of the object and/or the simulated environment may be instantiated based at least in part on map data (e.g., which may define a topology of the environment; the location and/or dimensions of fixtures such as signage, plants, and/or buildings) and/or the scenario data.

Additionally or alternatively, the simulation may include a simulated object that is controlled by an agent behavior model as discussed in more detail in U.S. Pat. No. 11,338,825, filed Jun. 1, 2020, the entirety of which is incorporated by reference herein for all purposes, in addition to or instead of a nominal prediction component of the simulation component or a prediction component of the perception component 110. The agent behavior model may control simulated motion of a simulated representation of a dynamic object, such as a reactive dynamic object. In some examples, the simulation may be executed as part of a forecasting/prediction operation, so one or more simulations may be executed to determine a prospective scenario (e.g., predicted environment state data) based on a candidate action generated according to the tree search discussed herein.

In some examples, a simulated sensor may determine simulated sensor data based at least in part on a simulation executed by the simulation component. For example, U.S. patent application Ser. No. 16/581,632, filed Sep. 24, 2019 and the entirety of which is incorporated by reference herein for all purposes, discusses this in more detail. In an additional or alternate example, the simulation executed by the simulation component may itself comprise simulated sensor data. The perception component 228 (e.g., a copy thereof, which may comprise software and/or hardware, which may include hardware-in-the loop simulation) may receive such sensor data and/or simulated sensor data may output perception data that is provided as input to the planning component 232. The planning component may use the perception data to determine instructions for controlling motion of the vehicle 202, which may be used to control at least the simulated representation of the vehicle 202 in the simulation and, in some examples, may be additionally used to control real-world motion of the vehicle 202, such as in examples wherein the simulation component executes on-vehicle during real-world operation. In some examples, the simulation component may include a Kalman filter, ML model, or the like for determining the predicted characteristics of an object, such as the position, orientation, velocity, acceleration, state (e.g., door state, traffic signal state, passenger entry/exit state), and/or the like.

The memory 220 and/or 224 may additionally or alternatively store a mapping system, a planning system, a ride management system, simulation/prediction component, etc.

As described herein, the localization component 226, the perception component 228, the prediction component 230, the planning component 232, hierarchical tree search component 234, and/or other components of the system 200 may comprise one or more ML models. For example, localization component 226, the perception component 228, the prediction component 230, and/or the planning component 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (Deep ViT), convolutional vision transformer (CvT), detection transformer (DETR), Miti-DETR, or the like; VQGAN; and/or general or natural language processing transformers, such as BERT, RoBERTa, XLNet, GPT, GPT-2, GPT-3, GPT-4, or the like and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 242 (which may be a portion of the drive component(s)), which may be configured to control steering, propulsion, braking, safety, emitters, communication, and other systems of the vehicle 202. In some examples, the system controller(s) 242 may comprise additional or alternate hardware apart from memory 220 for interfacing with the drive component(s). In other words, the system controller(s) 242 may be stored in memory 220 totally, in part, or not at all, as the system controller(s) 242 may include hardware separate from memory 220. The system controller(s) 242 may communicate with and/or control corresponding systems of the drive component(s) 212 and/or other components of the vehicle 202. For example, the planning component 232 may generate instructions based at least in part on perception data generated by the perception component 228 and/or simulated perception data and transmit the instructions to the system controller(s), which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Overview of the Hierarchical Tree Search Technique

Figure 3B:
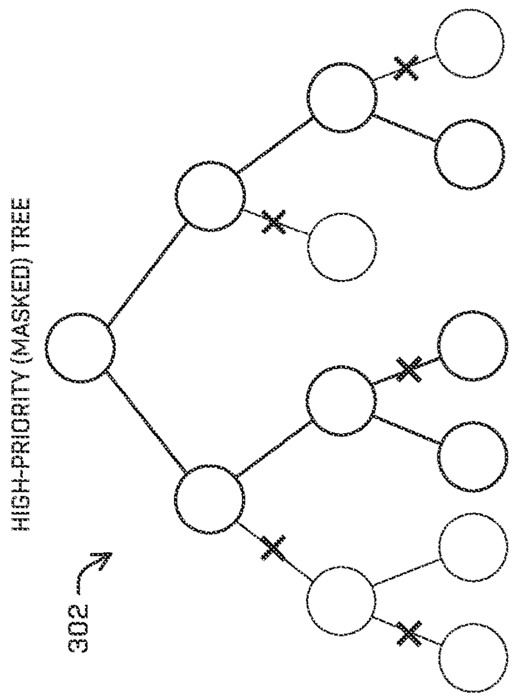
FIGS. 3A-3C illustrate a hierarchical tree search and optimal policies according to different levels of a hierarchical tree search.
Figure 3A:
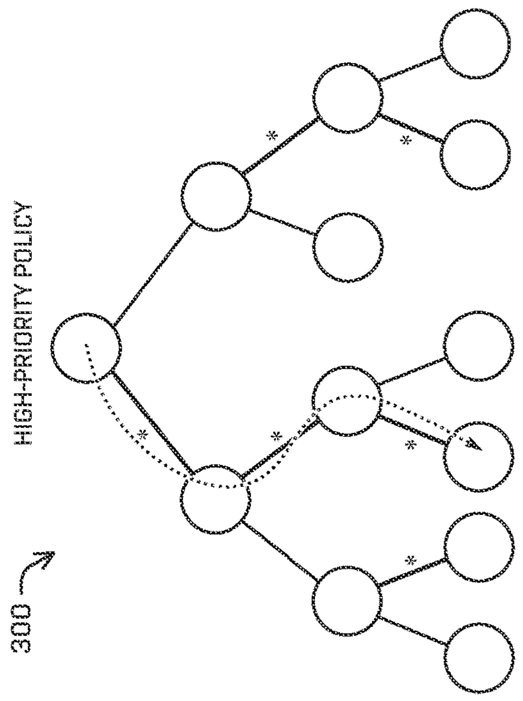
Figure 3C:
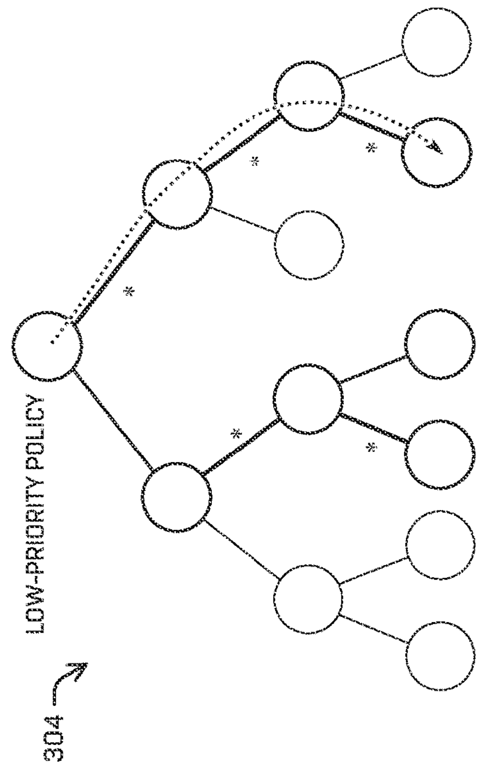

FIGS. 3A-3C illustrate a high-level overview of the hierarchical tree search techniques discussed herein and optimal policies according to different levels of a hierarchical tree search. Note that although the discussion herein includes discussions of an optimal policy, it will be understood from the remaining discussion that a truly optimal (converged) solution for each level need not be determined. For example, the techniques may include storing an upper bound cost and lower bound cost with up to each of the action nodes of the tree or at least up to each of those action nodes of the tree that are explored. The true optimal policy cost may lie between the upper bound and lower bound costs, as discussed in more detail below.

Each of the tree search states depicted in FIGS. 3A-3C include action nodes depicted as circles. An action node may be associated with a candidate action, which may be translated into a trajectory sufficient for operating a controller of a vehicle over a time period. For the sake of simplicity, it is assumed that the optimal action is determined by the hierarchical tree search at each split of the tree. The optimal action node for a particular level, indicated by an asterisk, may be an action node for which a cost (for the respective level) determined for that action node is less than all the other action nodes of a same tier of the tree.

FIG. 3A depicts an example tree search state 300 associated with a first (highest) level priority objective of the hierarchical tree search discussed herein. For example, the order of the levels of priority may be set beforehand. For example, a first (highest) level priority may be associated with trajectory feasibility, i.e., whether the vehicle is capable of performing an action from a previous state or, in an example where candidate actions in the tree are pre-filtered for physical/kinematic feasibility, the first level priority may be associated with safety of the resultant path. Accordingly, a cost determined for a candidate action associated with a candidate node at the first level may be determined by one or more cost functions associated with the first level objective. These cost functions may be specific to the first level objective and may be based on first level sub-costs, whereas a subsequent level objective may be associated with another one or more cost functions that are based on different subsequent level sub-costs. The tree search state 300 may be a state of the tree search in which costs for each candidate node have been determined using the cost function(s) associated with the first level objective, although it is understood that the tree search may only determine a cost for those action nodes that are determined to be explored. According to the first level costs, the optimal path is indicated by the dashed line extending through four action nodes on the left side of the tree. Note that this optimal path may be optimal for the first level cost functions.

FIG. 3B depicts an example tree search state 302 that includes masking out branches of the tree that are associated with paths through the tree that did not achieve a first level score that was less than another branch from a same parent node. Note that, at each set of branches from a node, one or branches is identified as being optimal. In some examples, non-optimal paths may be paths where a cost associated with an individual action node or a sum of costs associated with a path through the tree exceeds a slack amount or adaptive slack amount plus the cost of the optimal path identified at the example tree search state 300.

FIG. 3C depicts an example tree search state 304 associated with a second level priority objective of the hierarchical tree search. Costs may be determined for those action nodes that remain after masking, as depicted in FIG. 3B, using cost function(s) associated with the second level priority objective. Again, the optimal costs, for the second level, are depicted with an asterisk. Accordingly, the right-hand path from the root node is optimal at the second level and fits the constraints imposed by the masking. If the second level is the final level of the hierarchy, the path depicted in FIG. 3C as a dashed line, comprising four action nodes, three of which are different from the four action nodes of the path identified in FIG. 3A, may be used by the vehicle for controlling motion of the vehicle. However, if a subsequent level priority objective exists, the masking procedure may be repeated and new costs may be determined according to that level's cost function(s) and so on until a final level is reached.

Example Candidate Actions Generated for Explored States of the Vehicle

Figure 4:
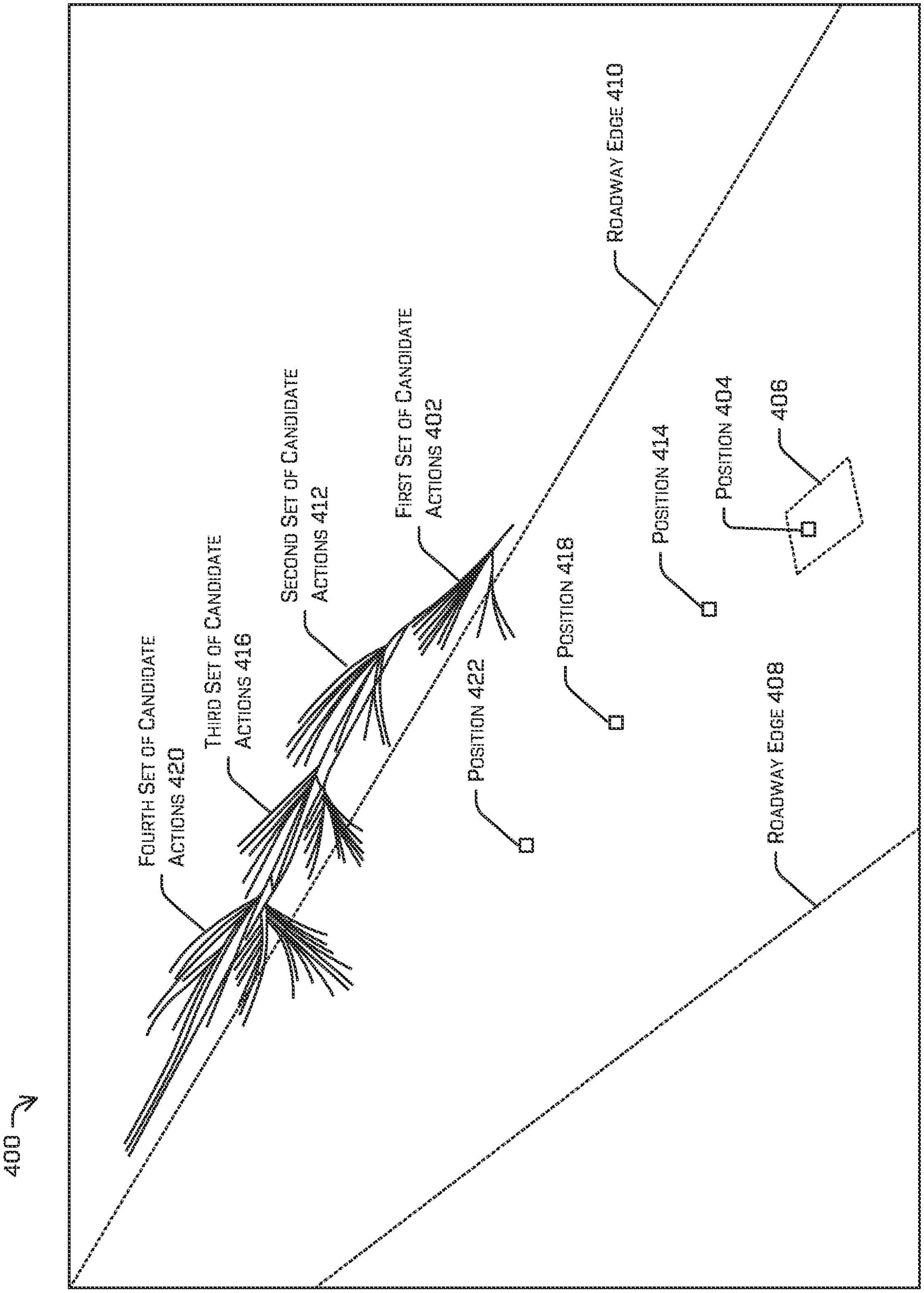
FIG. 4 illustrates a three-dimensional representation of sets of different candidate trajectories generated for a branch of the tree search, such as one of the optimal paths discussed in FIGS. 3A-3C.

FIG. 4 illustrates a three-dimensional representation 400 of four different sets of candidate actions (i.e., trajectories in the depicted example) generated at four different action layers of the tree search along a single branch of a tree search. The first set of candidate actions 402 may have been generated based at least in part on a position 404 of the vehicle. These candidate actions 402 may additionally or alternatively be determined based at least in part on an orientation, velocity, acceleration, steering rate, environment state data indicated in association with a root node (as discussed in more detail above regarding static/dynamic objects, etc.) associated with operation of the vehicle. The space occupied by the vehicle is represented at 406 as a dashed line. FIG. 4 also represents two roadway edges, roadway edge 408 and roadway edge 410. The height of a candidate action indicates a velocity and/or acceleration associated with the candidate action.

A second set of candidate actions 412 may be generated based at least in part on selecting a first candidate action of the first set of candidate actions 402 for exploration and based at least in part on a final position 414, orientation, velocity, steering rate, etc. that the first candidate action would cause the vehicle to accomplish upon concluding execution of the first candidate action and environment state data. The second set of candidate actions 412 may additionally or alternatively be determined based at least in part on environment state data indicated by prediction node determined based at least in part on the first candidate action.

The third set of candidate actions 416 may similarly be based at least in part on selection of a second candidate action from among the second set of candidate actions 412; environment state data generated in association therewith; and/or the final position 418, orientation, velocity, steering rate, etc. that the second candidate action would effect. The fourth set of candidate actions 420 may similarly be based at least in part on selection of a third candidate action from among the third set of candidate actions 416; environment state data generated in association therewith; and/or the final position 422, orientation, velocity, steering rate, etc. that the third candidate action would effect.

Note that, although FIG. 4 depicts generating new candidate actions at each position, the candidate action(s) explored at a position in the tree search may additionally or alternatively included one or canonic candidate actions, which may be thought of as typical default actions, such as a trajectory associated with keeping the vehicle at a center reference line, slightly left or right of a lane reference line, executing a turn, and/or the like. In such an example, the tree search may determine to transition the vehicle between different canonic actions or between a canonic action and a dynamically generated candidate action.

Example Hierarchical Tree Search Process

Figure 5A:
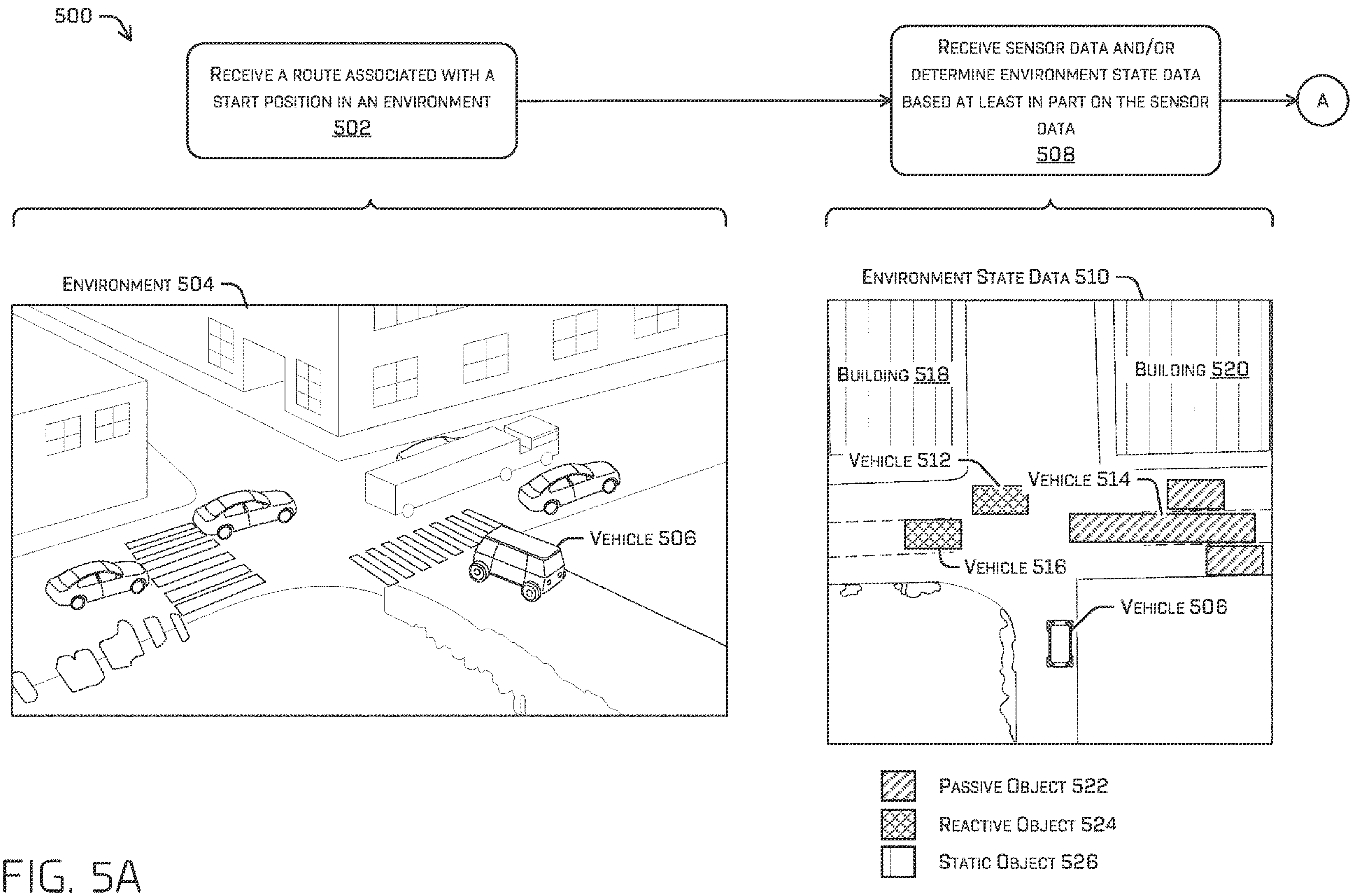
FIGS. 5A-5C illustrate a pictorial flow diagram of an example process for generating a path for controlling an autonomous vehicle using a hierarchical tree search.
Figure 5B:
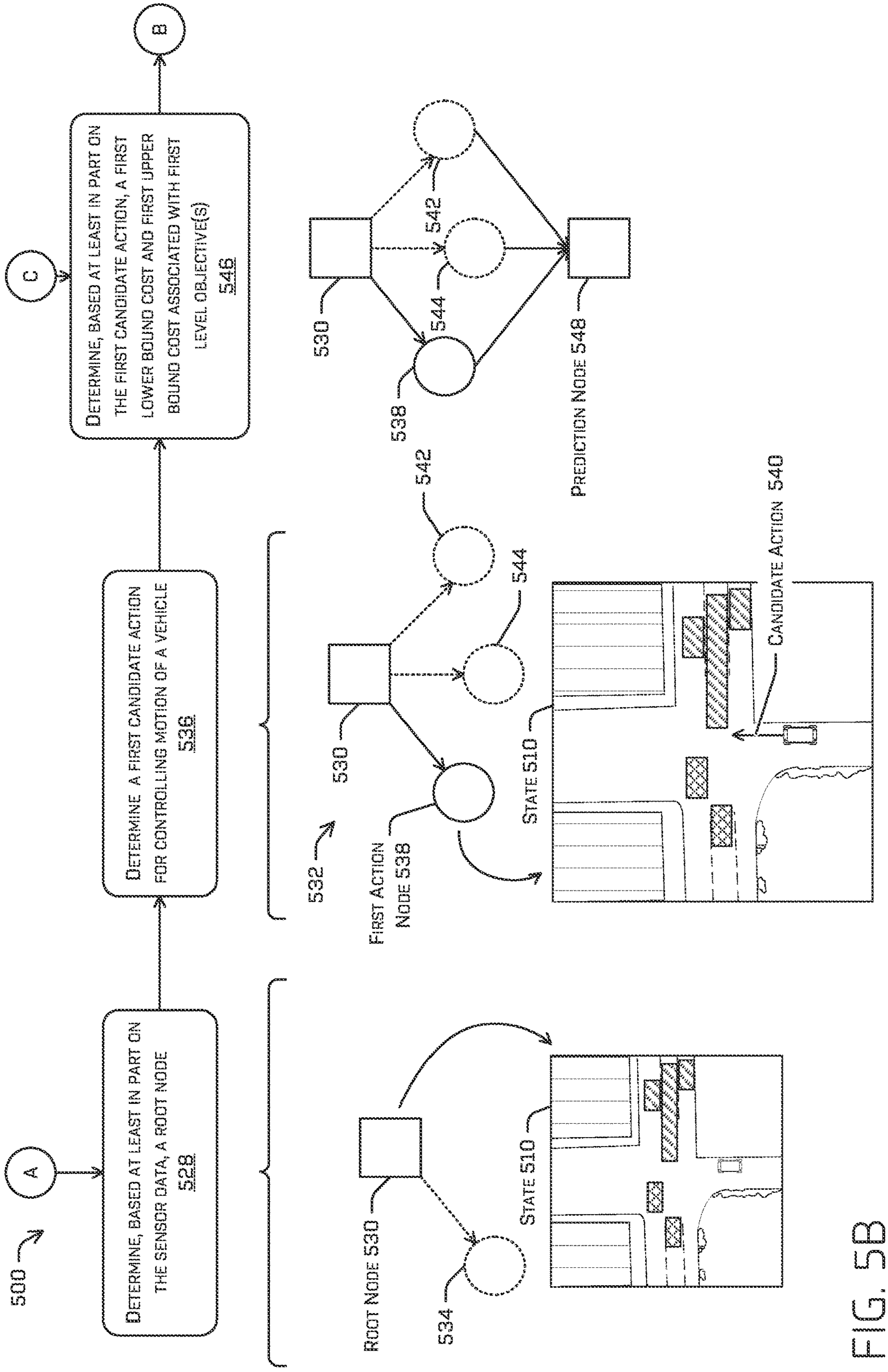
Figure 5C:
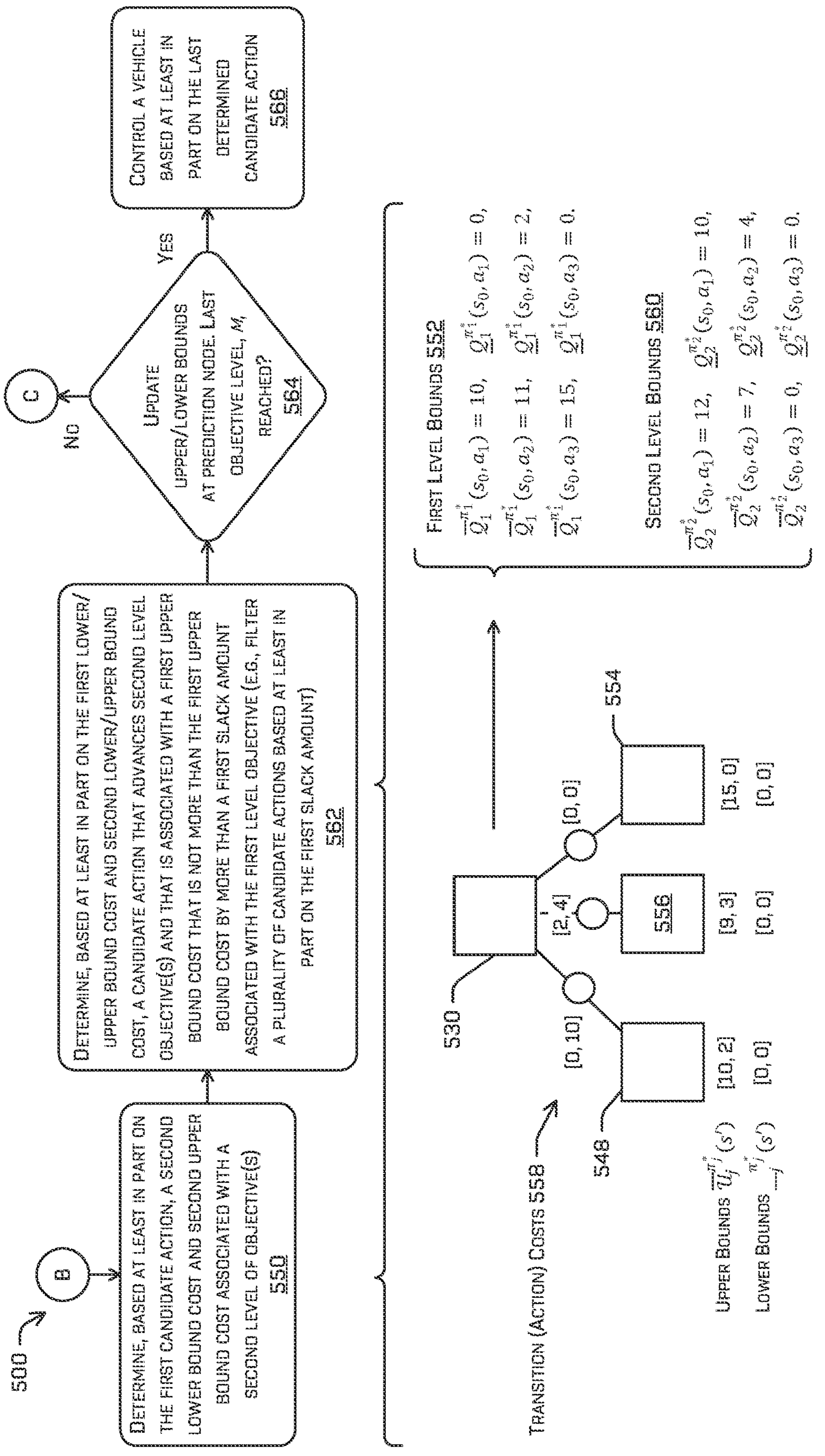

FIGS. 5A-5C depict an example process 500 for generating a trajectory or a path (e.g., two or more contiguous trajectories) for controlling an autonomous vehicle using a hierarchical tree search. In some examples, a guidance system of the planning component of the vehicle 202 may execute process 500, such as by one or more CPU(s), GPU(s), TPU(s), and/or other processing units (e.g., ASIC(s), FPGA(s)). In some examples, the tree search discussed herein may be structured as a Markov decision process (MDP) or partially-observable MDP (POMDP) and may comprise a value iteration algorithm for processing the MDP or POMDP.

At operation 502, example process 500 may include receiving a route associated with a start position and an end position in an environment, according to any of the techniques discussed herein. FIG. 5A depicts an environment 504 in which a vehicle 506 is located that is executing example process 500. The start position may be associated with a current position of the vehicle 506 and the route may specify an end position, such as a passenger pickup or drop-off zone, and may, in some examples, include intervening targets or operations, such as exiting a freeway, seeking to stay in a particular lane, targeting parking on a particular block (but not a particular position, although in some examples, a particular portion of the block may be identified), etc.

At operation 508, example process 500 may comprise receiving sensor data from one or more sensors, according to any of the techniques discussed herein. The sensor(s) may be associated with the vehicle and/or another computing device. Operation 508 may additionally or alternatively comprise determining environment state data based at least in part on the sensor data. In some examples, the perception component may determine the environment state data 510. The environment state data 510 may be associated with a most recently received set of sensor data (e.g., a current time, although there may be a small delay between receiving the sensor data and determining the perception data).

To further illustrate, the environment state data 510 may comprise a position, orientation, and/or characteristics of the vehicle 506 in the environment, which may correspond to real-time operation of an autonomous vehicle. The environment state data 510 may additionally or alternatively comprise an indication of an object type associated with one or more objects (e.g., passenger vehicle 512, oversized vehicle 514, passenger vehicle 516, building 518, building 520) and/or characteristics associated with the one or more objects (e.g., a position, velocity, acceleration, heading, material type, kinematic coefficient). Note that the environment state data 510 is represented as a two-dimensional image, although, in additional or alternate examples, the environment state data 510 may comprise a data structure, such as a pub-sub message, a three-dimensional representation, and/or the like. In some examples, the environment state data 510 may further comprise a prediction of whether an occluded object exists, as discussed in more detail in U.S. Pat. No. 11,231,481, filed May 8, 2019, the entirety of which is incorporated by reference herein for all purposes. In an additional or alternate example, the prediction of whether an occluded object exists may be determined by a machine-learned model that receives the environment state data as input and outputs a field of likelihoods. Any region of the environment associated with a likelihood that meets or exceeds a threshold may be output as a potential false negative, which may be used as part of the candidate action generation.

The environment state data may comprise an object classified by the perception component as being dynamic. For example, a dynamic object, which may also be referred to herein as an agent, may comprise a vehicle, a bicyclist, pedestrian, a ball, a wind-blown plastic bag, and/or any other moveable object or object that is likely to move within a time period. An object such as a bench or table may be moveable but, in a time period relevant to operation of the vehicle, is unlikely to move and may be considered a static object. The environment state data 510 may include dynamic object(s) and may include a dynamic object classification and/or likelihood determined by the agent filter in association with a dynamic object. For example, the classification may include whether a dynamic object is passive or reactive and/or a likelihood thereof, as discussed in more detail in U.S. Patent Application Publication No. 2023/0041975, filed Aug. 4, 2021, the entirety of which is incorporated by referenced herein for all purposes. An agent filter, as described in U.S. Patent Application Publication No. 2023/0041975, may comprise an ML model trained to receive an object track associated with a dynamic object, a current state of the vehicle and/or a candidate action as discussed further herein, and/or sensor data associated with the dynamic object and determine, by a neural network or any of the other ML techniques discussed above, a classification and/or a confidence score (e.g., a posterior probability, a likelihood) that a dynamic object is passive or reactive. In some examples, if the confidence score determined by the ML model meets or exceeds a confidence threshold, the detected object may be classified as a reactive object; otherwise, the detected object may be classified as a passive object. In yet another example the ML model may additionally or alternatively output, from a last layer, the classification itself in addition to or instead of the confidence score.

Turning to FIG. 5B, at operation 528, example process 500 may include determining, based at least in part on the sensor data, a root node 530 of the tree search, according to any of the techniques discussed herein. In some examples, determining the root node may comprise determining a data structure 532 for the tree search, which may comprise setting up and storing a directed acyclical graph (DAG); upper confidence bounds applied to trees (UCT); determinized sparse partially observable tree (DESPOT); or the like for modeling control states and environment states. The root node may be associated with a current time and/or the most recent sensor data or batch of sensor data. As such, the root node may be associated with perception data that may or may not include prediction data. In other words, the root node may identify environment state data that includes a current position, orientation, velocity, acceleration, classification, etc. of static and/or dynamic objects (including similar information for the vehicle, which may be generated by the localization component of the vehicle) in the environment and may additionally or alternatively include historical data of the same.

Predictions of how the object(s) will behave in the future, correspondingly how this data will change in the future, may be associated with the prediction node(s) discussed herein and, in some examples, the prediction data for a current time step may be associated with the root node. In other words, the root node may include the current state of the environment, including the object(s) therein, localization data related to the vehicle (e.g., determined by SLAM), and/or prediction data identifying one or more possible future states of the environment, which may include a position, orientation, velocity, acceleration, classification, etc. of an object associated with a future time.

The figures depict prediction nodes (and the root node, which may be a prediction node) as squares, and action nodes as circles. The dashed line and circle 534 represent the relationship between the root node 530 and an as-of-yet unexplored action node that is based on the root node 530. The root node 530 may identify the environment state data 510 and one or more predicted environment scenarios. For simplicity only the current environment state data is displayed in FIGS. 5A-5C for the sake of space.

At operation 536, example process 500 may include determining a first candidate action for controlling motion of the vehicle, according to any of the techniques discussed herein. The first candidate action may be one candidate action of a set of candidate actions. Operation 536 may additionally or alternatively determine, as the first candidate action, a transition between a second candidate action and a third candidate action. In some examples, the first candidate action may be based at least in part on a previous prediction node, such as in an example where the previous state is known and the candidate action is generated to determine a next prediction node. In another example, the first candidate action may be based at least in part on a next prediction node, such that the first candidate action is generated to reach that next prediction node. Either example may be used, depending on the configuration of the tree search. The first candidate action determined at operation 536 may be determined based at least in part on a prediction node of a most recently determined layer of prediction nodes, whether that is previous prediction nodes that were reached by previously selected candidate actions or next prediction nodes that are to be reached by the candidate actions generated at operation 536.

FIG. 5B depicts two layers of prediction nodes, which includes the root node 530 and the prediction node 548. More prediction nodes in the layer associated with prediction node 548 may exist but are unillustrated. To differentiate the two types of candidate action generation, the tree search, at candidate action generation, may determine the candidate action then determine a vehicle state that would result from executing that action or, in a second example, the tree search may determine a predicted state and determine a candidate action that would result in that predicted state.

Regardless, determining the first candidate action may include receiving a canonical candidate action from memory and/or providing to the planning component environment state data associated with a prediction node upon which the candidate action is based and receiving the candidate action from the planning component. The first action node 538 may indicate one or more candidate actions that are based on environment state data indicated by the root node 530. FIG. 5B depicts one such candidate action, candidate action 540, which comprises controlling the vehicle to move straight forward, which may be an example of a canonical action.

The environment state data may be current environment state data (if the prediction node is the root node) or predicted environment state data associated, as discussed above. Regardless, determining the first candidate action at the planning component may comprise a nominal method of trajectory planning. In an additional or alternate example, determining the candidate action based at least in part on the environment data may include a trajectory determination system separate from the nominal trajectory generation system of the planning component. This separate system may determine a candidate action based at least in part on a lane reference type, a target type, an expansion variable, an offset, a multiplier, and/or a propensity type.

The lane reference type may be an indication of whether a lane reference for generating the candidate action should be generated using sensor data or using a predefined lane reference, such as may be indicated in a pre-generated map. A lane reference may or may not be associated with a center of the lane (e.g., the lane reference may be a center of the lane for a straight lane portion, but on curves the lane reference may be biased toward the inside or outside of the curve).

The target type may define an action type for accomplishing the current route or mission. For example, the target type may specify a current lane of the vehicle, an adjacent lane, a parking space, a position in free space (e.g., where no lane markings exist), or the like.

The expansion variable may identify a weight, distance, factor, and/or other bounds on how far laterally (and/or longitudinally in some examples) unoccupied space can be explored (e.g., how far laterally candidate actions can take the vehicle). For example, the expansion variable may be a general constraint for how different the candidate actions may be.

The offset may identify a predetermined distance from the lane reference by which to iterate exploration of candidate actions. The distance may additionally or alternatively be determined dynamically based at least in part on sensor data, such as a speed of the vehicle, a complexity of the environment (see U.S. patent application Ser. No. 17/184,559, filed Feb. 24, 2021, the entirety of which is incorporated by reference herein for all purposes), or the like.

The multiplier may be a factor between 0 and 1, which may be multiplied by the current maximum speed allowed by the law to determine the maximum speed associated with the candidate action. The multiplier may be randomized, varied according to a pattern, and/or may be constrained based at least in part on bounds set by the planning component based at least in part on the environment state data and the previous trajectory of the vehicle.

The propensity type may identify curvature, velocity, and/or acceleration constraints associated with different behavior types, such as "assertive," which may be associated with higher curvature, velocity, and/or acceleration and which may be required when the perception component detects a complex environment or other assertive traffic; "nominal" which may provide a baseline for typical interactions with other agents; "conservative;" and/or "submissive." The perception engine and/or the planning component may work together to determine the propensity type to be used, as discussed in more detail in U.S. Pat. No. 11,541,909, filed Aug. 28, 2020, the entirety of which is incorporated by reference herein for all purposes.

Once the planning component generates a first candidate action, the guidance component may update the data structure 532 to include the first action node 538 that identifies the first candidate action. FIG. 5B also depicts two more action nodes, 542 and 544, which are illustrated with dashed lines, as they are not currently being explored.

In some examples, the first candidate action may be associated with controlling the vehicle over a first time period. As discussed below, a candidate action of a layer deeper than the layer associated with the first candidate action (e.g., which also includes action nodes 542 and 544) may be associated with controlling the vehicle over a second time period. In some examples, the time periods associated with each subsequent layer of action nodes may be equal or, in an additional or alternate example, the time periods may increase in length (e.g., exponentially, logarithmically). For example, the first candidate action may be associated with controlling the vehicle over a 1 second period, a second candidate action associated with an action node one layer deeper than the first layer may control the vehicle over 1.1 seconds, a third layer may control the vehicle over a period of 1.25 seconds, and so on. This increasing time period may ensure that a greater precision and/or accuracy is obtained for imminent actions, while also ensuring that the more distant actions won't control the vehicle in a manner that results in higher costs/negative outcomes.

At operation 546, example process 500 may include determining, based at least in part on the first candidate action, a first lower bound cost and first upper bound cost associated a first level objective, according to any of the techniques discussed herein. The discussion that follows gives context for these upper and lower bound costs before discussing how to determine the upper and lower bounds themselves.

In some examples, the first level objective may comprise one or more objectives, such as, for example, safety, safety and impact avoidance, or impact avoidance, although it's understood additional or alternate examples of objectives may be used in a first level objective. In some examples, the first level objective may be associated with a greatest priority objective, according to a design implementation. For example, a greatest priority objective may include avoiding impacting another object and/or the general safety of a candidate action.

In some examples, a cost may include a positive integer that indicates an estimated conformance of a candidate object to a particular objective. A cost may be determined for a candidate action based at least in part on one or more cost functions associated with the current level objective. According to a first example, the higher the cost, the less the candidate action conforms to the objective. In the safety example, this could mean that the higher the cost, the less safe the candidate action is estimated to be. For example, a safety cost function may take into account, via the linear scalarization discussed below, conformance of the candidate action to rules of the road, a minimum distance between an object and the vehicle that would result from controlling the vehicle according to the candidate action, and/or the like. In some examples, an objective level may be associated with multiple objectives, such as both an impact avoidance objective and a safety avoidance objective. In such an instance, an impact avoidance sub-cost and a safety sub-cost may be totaled to determine the cost associated with a candidate action for the current objective level. In an additional or alternate example, the sub-costs may be determined together. For example, the impact avoidance objective may be based at least in part on a minimum distance between the vehicle and a nearest object, an acceleration required to avoid impact, a time until impact, a predicted likelihood of impact, and/or the like.

Determining the cost for a candidate action, whether it's determined using one or more sub-costs, may be notated as follows, where the cost to achieve a particular state of the vehicle, s, by a particular candidate action, is given as $$\mathcal{U}^{\pi}(s) = h_{\theta}(U^{\pi}(s)) \tag{1}$$

where $U^{\pi}$ is a vector of cost functions that make up the cost determination or a particular candidate action and where $h_{\theta}: \mathbb{R}^{m} \rightarrow \mathbb{R}$ is the scalarization function parameterized by $\theta \in \mathbb{R}^{p}$. In some examples, the state, s, may include a vehicle pose (i.e., position and/or orientation), velocity, acceleration, indicator state, door state, and/or the like, which may be accomplished by one or more actions that comprise the instructions for controlling the vehicle to achieve that state. The state may be associated with a prediction node in the tree search and a candidate action may be associated with an action node in the tree search. The examples of cost functions exist and one such manner of using a cost function for a particular objective, includes linear scalarization, where:

$$\mathcal{U}^{\pi}(s) = \sum_{j=1}^{m} w_j \mathcal{U}_j^{\pi}(s) \tag{2}$$

where m is the number of objectives, $w_j \in \mathbb{R}_+$ is an objective-specific weight (and although it's depicted as being positive it could be positive, negative, or either), and $$\mathcal{U}_j^{\pi}(s)$$

is the j-th element of $U^{\pi}(s)$. For example, to return to the impact avoidance objective, which could be an m=1 objective, weights $w_j$ may be tuned for each of a minimum distance between the vehicle and a nearest object, an acceleration required to avoid impact, a time until impact, a predicted likelihood of impact, and/or the like, which may be the j-terms of $$\mathcal{U}_j^{\pi}(s).$$

Note that nonlinear scalarization functions may be used, although it's simpler to speak of linear scalarization cost functions to give a conception of what a cost determined for an objective may be.

Equation (2) does not take into account the objective levels and hierarchical tree search discussed herein. The hierarchical tree search includes ordering the m objectives into different levels, each of which may include one or more cost functions or sub-objectives. For example, a first objective level may include impact avoidance alone or impact avoidance and safety; a second objective level may include safety if impact avoidance was exclusively determined in the first level, progress along a route alone (in an example where impact avoidance and safety were determined together in the first level), progress and comfort, progress, comfort, and driving performance; and so on or any combination thereof or including other objective(s)). To give further examples of sub-costs that may be part of the cost functions associated with these different objectives, a progress objective may be associated with a cost function that is based at least in part on displacement along a route and/or deviation from the route, a comfort objective may be associated with a cost function that is based at least in part on a lateral and/or longitudinal acceleration, jerk, acceleration threshold, jerk threshold, and/or the like, etc.

In such an example, equation (2) may be re-cast as equation (3) to determine a candidate action associated with an optimal (e.g., lowest, in an example where increasing cost indicates lack of conformity to an objective) cost at a level before moving on to a next level, i.e., $$\mathcal{U}_j^{\pi_j^*}(s),$$

where the asterisk, *, indicates the optimal candidate action for the j-th objective level, where j=1, . . . , m. Equation (3) is an example of a strict hierarchical tree search that enforces a strict constraint without slack. The strict constraint dictates that the candidate determined at the j-th level must also not be a candidate action that would result in an i-th level cost that is less then the i-th level cost associated with the candidate action selected at the i-th objective level, where the i-th level is the level before the j-th level. In other words, at the j-th level, any candidate action that optimizes for the j-th level may be selected that does not have an i-th level cost that exceeds the cost of the candidate action that was selected at the i-th level (i.e., that was the optimal i-th level cost).

$$\mathcal{U}_j^{\pi_j^*}(s) := \min_{\pi_j} Q_j^{\pi_j^*}(s, \pi_j(s)), \quad \text{s.t. } Q_i^{\pi_i^*}(s, \pi_j(s)) \le \mathcal{U}_i^{\pi_i^*}(s), \forall\, i < j, \tag{3}$$

for j=1, . . . , m.

For example, the strict hierarchical tree search may determine a first candidate action at a first level that may have the (objective) costs $$U^{\pi_1^*}(s) = [10, 15, 6],$$

a second candidate action different from the first candidate action at a second level that may have the costs $$U^{\pi_2^*}(s) = [10, 14, 12],$$

and a third candidate action at a third level that may have the costs $$U^{\pi_3^*}(s) = [10, 14, 9],$$

Note that the second candidate action does not regress the first cost, 10, but improves the second cost from 15 to 14, and the third candidate action does not regress the first cost or the second cost, 10 and 14, and improves the third cost from 12 to 9. A candidate action that has the costs $$U^{\pi_3^*}(s) = [11, 14, 9]$$

would not be feasible according to the strict hierarchical tree search because the first cost would regress by one, from 11 to 10. Note that the regret, $r_i(s, a)$, i.e., how much using candidate action, a, instead of the optimal action, $\pi^*_i(s)$, from state s would regress a cost (i.e., cause the cost to increase) is given by:

$$r_i(s, a) = Q_i^{\pi_i^*}(s, a) - \mathcal{U}_i^{\pi_i^*}(s) \tag{4}$$

Also note that this explains the difference between the Q-values and U-values. The U-value is the optimal cost to reach a state for a particular objective level, whereas the Q-value is the cost of an alternative action for reaching that state for a particular objective level.

An example hierarchical tree search with slack may allow a candidate action to be determined that is allowed to regress a previous cost, but not by more than a slack amount (i.e., threshold difference) from the cost of a candidate action determined at a previous level. This may be expressed as:

$$\mathcal{U}_j^{\pi_j^*}(s) := \min_{\pi_j} Q_j^{\pi_j^*}(s, \pi_j(s)), \quad \text{s.t. } Q_i^{\pi_i^*}(s, \pi_j(s)) \le \mathcal{U}_i^{\pi_i^*}(s) + \beta_i, \forall\, i < j, \tag{5}$$

for j=1, . . . , m. The scalar $\beta_i \geq 0$ is an objective-specific slack value for the i-th level. In some examples, the slack amount may differ for up to each objective level, although it may be the same for all of the levels. This is illustrated in more detail in FIGS. 6A and 6B.

However, equation (5) requires that the computation converge and that the optimal cost and its associated candidate action be determined at each level. The hierarchical tree search discussed herein dispenses with this by determining an upper bound cost and a lower bound cost that defines a range in which the true optimal cost lies, allowing the hierarchical tree search to not need to converge, although it may in some cases. In some examples, the upper and lower bound cost may be determined for a candidate action and may be associated with the action node in the tree search with which that candidate action is associated. Assuming the hierarchical tree search is configured as an MDP or POMDMP, the j-th objective level cost and candidate action determination may be given by:

$$\mathcal{U}_j^{\pi_j^*}(s) = \min_{a} \mathcal{Q}_j^{\pi_j^*}(s, a), \quad \text{s.t. } \mathcal{Q}_i^{\pi_i^*}(s, a) \le \mathcal{U}_i^{\pi_i^*}(s) + \beta_i, \; i < j, \tag{6}$$

where:

$$\mathcal{Q}_i^{\pi_i^*}(s, a) = C_i(s, a) + \gamma\sigma\left(\mathcal{U}_i^{\pi_i^*}(s'), s, a\right), \tag{7}$$

where $C_i(s, a)$ is a transition cost of taking an action, a, from state s; y is the discount factor used to define the infinite horizon cost-to-go; σ is a risk transition mapping for a Markov risk measure, and $$\mathcal{U}_i^{\pi_i^*}(s')$$

is the U-value of the optimal policy to reach the child state, s', which is, in essence, the sum of costs to reach the child state, s', according to that policy. In some examples, the transition cost, $C_i(s, a)$, may include costs such as, for example, comfort metrics associated with the action (e.g., an acceleration and/or jerk associated with the action), a deviation from a route associated with the action, a distance from one or more other objects, a displacement along a route (e.g., progress made along the route), and/or the like. In some examples, the Markov risk measure may include the expected value or mean.

The hierarchical tree search may determine upper and lower bound costs associated with the optimal cost of each objective level's optimal policy (i.e., path for controlling the vehicle comprising candidate actions selected at each tier of the tree search), $$\{\pi_1^*, \pi_2^*, \ldots, \pi_m^*\},$$

for controlling the vehicle. The upper and lower bound costs for the optimal policy may be denoted by $$\overline{U}^{\pi_j^*} \text{ and } \underline{U}^{\pi_j^*},$$

where the i-th element of these vectors may be denoted by $$\overline{\mathcal{U}}_i^{\pi_j^*}$$

and $$\underline{\mathcal{U}}_i^{\pi_j^*}.$$

The true optimal policy for a particular objective level of the hierarchical tree search lies between these upper and lower bound costs. Similarly, the candidate action upper and lower bound costs may be denoted as $$\overline{Q}^{\pi_j^*} \text{ and } \underline{Q}^{\pi_j^*},$$

where the i-th element of these vectors are denoted by $$\overline{Q}_i^{\pi_j^*} \text{ and } \underline{Q}_i^{\pi_j^*}.$$

Again, note that the U-values may the cost of following a policy from state, s, whereas the Q-values denote taking an action, a, from state, s, then following that policy thereafter, potentially up to infinity (hence use of the discount factor discussed above and below). Note that the upper bound cost and lower bound costs may be vectors since the costs may be vectors. For example, a cost vector associated with a candidate action may include different portions that are associated with different levels of the hierarchy. Accordingly, the estimated bounds may also be vectors.

The upper bound cost, $$\overline{\mathcal{U}}_j^{\pi_j^*}(s),$$

on the optimal policy, $$\mathcal{U}_j^{\pi_j^*}(s),$$

at a j-th objective level of the hierarchical tree search may be given by:

$$\overline{\mathcal{U}}_j^{\pi_j^*}(s) := \overline{\mathcal{Q}}_j^{\pi_j^*}(s, \overline{a}_j^*), \tag{8}$$

$$\text{where}$$

$$\overline{a}_j^* = \underset{a}{\operatorname{argmin}}\, \overline{\mathcal{Q}}_j^{\pi_j^*}(s, a),$$

$$\text{s.t. } \overline{\mathcal{Q}}_i^{\pi_i^*}(s, a) \le \underline{\mathcal{U}}_i^{\pi_i^*}(s) + \beta_i, \quad i < j.$$

Similarly, the lower bound cost, $$\underline{\mathcal{U}}_j^{\pi_j^*}(s),$$

on the optimal policy, $$\mathcal{U}_j^{\pi_j^*}(s),$$

at a j-th objective level of the hierarchical tree search may be given by:

$$\underline{\mathcal{U}}_j^{\pi_j^*}(s) := \underline{\mathcal{Q}}_j^{\pi_j^*}(s, \underline{a}_j^*), \tag{9}$$

$$\text{where}$$

$$\underline{a}_j^* = \underset{a}{\operatorname{argmin}}\, \underline{\mathcal{Q}}_j^{\pi_j^*}(s, a),$$

$$\text{s.t. } \underline{\mathcal{Q}}_i^{\pi_i^*}(s, a) \le \overline{\mathcal{U}}_i^{\pi_i^*}(s) + \beta_i, \quad i < j.$$

For all the other objective levels, where i≠j, i.e., those objective levels that are not currently being explored by the hierarchical tree search, the upper and lower bounds may be given by:

$$\overline{\mathcal{U}}_i^{\pi_j^*}(s) = \max_a \overline{\mathcal{Q}}_i^{\pi_j^*}(s, a), \tag{10}$$

$$\text{s.t. } \underline{\mathcal{Q}}_j^{\pi_j^*}(s, a) \le \overline{\mathcal{U}}_j^{\pi_j^*}(s),$$

$$\underline{\mathcal{Q}}_i^{\pi_j^*}(s, a) \le \overline{\mathcal{U}}_i^{\pi_i^*}(s) + \beta_i, \quad i < j,$$

$$\text{and}$$

$$\underline{\mathcal{U}}_i^{\pi_j^*}(s) = \min_a \underline{\mathcal{Q}}_i^{\pi_j^*}(s, a), \tag{11}$$

$$\text{s.t. } \underline{\mathcal{Q}}_j^{\pi_j^*}(s, a) \le \overline{\mathcal{U}}_j^{\pi_j^*}(s),$$

$$\underline{\mathcal{Q}}_i^{\pi_j^*}(s, a) \le \overline{\mathcal{U}}_i^{\pi_i^*}(s) + \beta_i, \quad i < j.$$

where the constraints may filter out any actions that either cannot possibly be optimal or cannot possibly satisfy the constraints of the original problem. For example, the lower bound cost may filter out any candidate actions that cannot be feasible. In some examples, the upper and lower bound cost for a predicted state may be associated with a prediction node in the tree search. In some examples, this may include storing the upper and lower bound determined at Equation 11 with that prediction node.

The hierarchical tree search may determine these upper and lower bound costs and store them for up to each level of the tree search. Moreover, the hierarchical tree search may propagate updates to the estimated upper and lower bounds through the tree using recursion. For example, the upper bound cost and lower bound cost for a candidate action, may be updated recursively from a leaf node (the furthest node in the tree down to the current iteration of the tree search, i.e., a deepest tier) to the root via:

$$\bar{Q}^{\pi_j^*}(s, a) = C(s, a) + \gamma\sigma\left(\bar{U}^{\pi_j^*}(s'), s, a\right), \quad (12)$$
$$\underline{Q}^{\pi_j^*}(s, a) = C(s, a) + \gamma\sigma\left(\underline{U}^{\pi_j^*}(s'), s, a\right),$$

for up to each objective, i.e., j=1, . . . , m. Accordingly, the upper and lower bound cost of deviating from the optimal policy by implementing a particular candidate action may be associated with the action node associated with that candidate action. In some examples, this may include storing the upper and lower bound determined at Equation 12 with that action node.

Turning to FIG. 5C, at operation 550, example process 500 may include determining, based at least in part on the first candidate action, a second lower bound cost and a second upper bound cost associated with a second level objective, according to any of the techniques discussed herein. Operation 550 may include determining a lower bound cost and upper bound cost according to a cost function associated with the second level objective. To give a more concrete example of operations 546 and 550, FIG. 5C includes example first level upper and lower bound costs that may be determined for three different candidate actions. For example, operation 546 may result in determining (using a first cost function associated with the first level objective and according to the equations discussed above) the first level bounds 552, which may be associated with three different candidate actions. Each of these candidate actions may result in different predicted states, which may each be associated with different prediction nodes 554, 556, and 548, although it is understood that, in some examples, two different candidate actions may result in a same predicted state. Accordingly, one or more of prediction nodes 554, 556, and 548 may be a same prediction node. In the depicted example, a first candidate action, $a_1$, may transition the vehicle from a state indicated by the root node 530 to a predicted state indicated by the prediction node 548; a second candidate action, $a_2$, may transition the vehicle from the root node 530 state to a predicted state indicated by the prediction node 556; and a third candidate action, $a_3$, may transition the vehicle from the root node 530 state to a predicted state indicated by the prediction node 554.

In the example depicted in FIG. 5C, at operation 550, the techniques may determine (using a second cost function associated with the second level objective and according to the equations discussed above) the second level bounds 560. The second level bounds 560 may be associated with the same candidate actions with which the first level bounds 552 are associated.

At operation 562, example process 500 may include determining, based at least in part on the first lower/upper bound costs and second lower/upper bound costs, a candidate action that advances the second level objective and that is associated with a first level upper bound cost that is not more than the first upper bound cost of the first candidate action by more than a first slack amount associated with the first level objective, according to any of the techniques discussed herein. Operation 546 may have identified the first upper bound cost associated with the first candidate action as being a lowest first level upper bound cost, a first level cost lower than a first threshold, or a first level upper bound cost less than n other first level upper bound costs, where n is a positive integer. Operation 562 may determine a selected candidate action that may be the first candidate action or another candidate action that may be associated with a second level upper bound cost that is the lowest second level upper bound cost, a second level upper bound cost lower than a second threshold, or a second level upper bound cost less than n or p other second level upper bound costs, where p is a positive integer, and that the selected action is associated with a second level upper bound cost that is not more than the first level upper bound cost by more than a slack amount associated with the first level objective. In other words, the selected candidate action for the second level may be one that is associated with a second level upper bound cost that is a minimum second level upper bound cost and that meets the slack constraint of the first level, i.e., the selected candidate action does not have a first level upper bound cost that would regress.

For example, for the first level objective, the first action, $a_1$, may have been selected from among the three candidate actions depicted in FIG. 5C since it is associated with an upper bound of $$\bar{Q}_1^{\pi_1^*}(s_0, a_1) = 10,$$

which is lower than the second candidate action's upper bound of $$\bar{Q}_1^{\pi_1^*}(s_0, a_2) = 11$$

and the third candidate action's upper bound of $$\bar{Q}_1^{\pi_1^*}(s_0, a_3) = 15.$$

Thus, the candidate action selected for the first objective level may be the first candidate action and:

$$\bar{\mathcal{U}}_1^{\pi_1^*}(s_0) = 10, \quad (13)$$
$$\underline{\mathcal{U}}_1^{\pi_1^*}(s_0) = 0.$$

For the sake of example, if the slack amount associated with the first level, $\beta_1$, may be 1. For such a slack amount, the third candidate action would be filtered out/excluded from consideration because although the third candidate action is associated with a second level upper bound of $$\bar{Q}_2^{\pi_2^*}(s_0, a_3) = 0,$$

which is the lowest for the depicted second level upper bounds, the third candidate action is associated with a first level upper bound of $$\overline{Q}_1^{\pi_1^*}(s_0, a_3) = 15,$$

which is 5 more than the upper bound cost of the candidate action selected at the first level, $$\overline{Q}_1^{\pi_1^*}(s_0, a_1) = 10.$$

Since the slack amount for the first level is 1, this difference of 5 exceeds 1, resulting in the third candidate action being excluded.

This leaves the first candidate action and the second candidate action as part of the subset that is feasible for selection at the second level and results in determining to select the second candidate action because the second candidate action is associated with a second level upper bound cost, $$\overline{Q}_2^{\pi_2^*}(s_0, a_2) = 7,$$

that is less than the second level upper bound cost, $$\overline{Q}_2^{\pi_2^*}(s_0, a_1) = 12,$$

associated with the first candidate action and the first level upper bound cost associated with the second candidate action, $$\overline{Q}_1^{\pi_1^*}(s_0, a_2) = 11,$$

is only 1 greater than the first level upper bound cost of the first candidate action, $$\overline{Q}_1^{\pi_1^*}(s_0, a_2) = 11,$$

$$\overline{Q}_1^{\pi_1^*}(s_0, a_3) \le \overline{\mathcal{U}}_1^{\pi_1^*}(s_0) + \beta_1, \quad 15 \le 10 + 1. \tag{14}$$

This satisfies the slack amount, permitting the second candidate action to be selected at the second level, since it doesn't regress the first objective by more than the slack amount.

In some examples, the slack amount may be further relaxed. For example, since $$\overline{Q}_i^{\pi_i^*}(s, a) \ge \overline{\mathcal{U}}_i^{\pi_i^*}(s)$$

for all actions a, constraint satisfaction in Equation (8) implies that:

$$\overline{\mathcal{U}}_i^{\pi_i^*}(s) \le \underline{\mathcal{U}}_i^{\pi_i^*}(s) + \beta_i, \quad i = 1, \ldots, j-1. \tag{15}$$

This condition shows that in the case of no slack (i.e. $\beta_i=0$) that the constraint may be satisfied if the tree search's bounds on the optimal hierarchical policy, $$\pi_i^*,$$

have converged (i.e., that $$\underline{\mathcal{U}}_i^{\pi_i^*}(s) = \overline{\mathcal{U}}_i^{\pi_i^*}(s)\Big).$$

In the case where slack is used, this condition suggests that we cannot begin to optimize lower-priority objectives until the i-th level converges. In some examples, convergence may not be feasible where the tree search horizon is limited and heuristic upper and lower bounds are used. To avoid this strict convergence requirement, we can relax the constraint by allowing the slack variable to be adaptive based on a current gap between an upper bound cost and lower bound cost:

$$\beta_{adaptive,i}(s) = \beta_i + \overline{\mathcal{U}}_i^{\pi_i^*}(s) - \underline{\mathcal{U}}_i^{\pi_i^*}(s), \tag{16}$$

where $\beta_{adaptive,i}(s)$ may be the adaptive slack. In other words, this means that the techniques may include increasingly relaxing the adaptive slack constraint as uncertainty in the true optimal value increases, but becoming stricter (i.e., decreasing the adaptive slack or having the adaptive slack amount equal the original slack amount, if the upper and lower bounds have converged) when certainty increases. In such an example using adaptive slack, the following approximations that approach the true solution as the confidence increases (i.e., the optimality gap decreases) may be determined as follows.

For example, the adaptive slack based approximation of the cost to go may be given by:

$$\mathcal{U}_j^{\pi_j^*}(s) := \min_{\pi_j} \mathcal{Q}_j^{\pi_j^*}(s, \pi_j(s)), \quad \text{s.t. } \mathcal{Q}_i^{\pi_i^*}(s, \pi_j(s)) \le \mathcal{U}_i^{\pi_i^*}(s) + \beta_i + \Delta_i, \ \forall\, i < j, \tag{17}$$

for j=1, . . . , m. The scalar $\beta_i \ge 0$ is an objective-specific slack value and $$\Delta_i = \overline{\mathcal{U}}_i^{\pi_i^*}(s) - \underline{\mathcal{U}}_i^{\pi_i^*}(s)$$

is the optimality gap of the i-th level. The upper bound cost for the j-th hierarchical level of a prediction node using adaptive slack may be updated at up to each iteration by:

$$\overline{\mathcal{U}}_j^{\pi_j^*}(s) := \overline{Q}_j^{\pi_j^*}(s, \overline{a}_j^*), \tag{18}$$

where $$\overline{a}_j^* = \operatorname*{argmin}_a \overline{Q}_j^{\pi_j^*}(s, a),$$

$$\text{s.t. } \overline{Q}_i^{\pi_i^*}(s, a) \le \overline{\mathcal{U}}_i^{\pi_i^*}(s) + \beta_i, \quad i < j.$$

With this adaptive slack constraint the tree search can be interpreted as optimizing lower priority objectives subject to the constraint that the current worst-case guess of optimal cost-to-go does not regress by more than the original slack amount (i.e., $\beta_i$).

The lower bounds in the relaxed adaptive slack problem may be determined by:

$$\underline{\mathcal{U}}_j^{\pi_j^*}(s) := \underline{Q}_j^{\pi_j^*}(s, \underline{a}_j^*), \tag{19}$$

where $$\underline{a}_j^* = \operatorname*{argmin}_a \underline{Q}_j^{\pi_j^*}(s, a),$$

$$\text{s.t. } \underline{Q}_i^{\pi_i^*}(s, a) \le \overline{\mathcal{U}}_i^{\pi_i^*}(s) + \beta_i + \Delta_i, \quad i < j.$$

The remaining components (i≠j) of the cost-to-go bounds are computed as follows:

$$\overline{\mathcal{U}}_i^{\pi_j^*}(s) = \max_a \overline{Q}_i^{\pi_j^*}(s, a), \tag{20}$$

$$\text{s.t. } \underline{Q}_j^{\pi_j^*}(s, a) \le \overline{\mathcal{U}}_j^{\pi_j^*}(s),$$

$$\underline{Q}_i^{\pi_i^*}(s, a) \le 2\overline{\mathcal{U}}_i^{\pi_i^*}(s) - \underline{\mathcal{U}}_i^{\pi_i^*}(s) + \beta_i, \quad i < j,$$

and:

$$\underline{\mathcal{U}}_i^{\pi_j^*}(s) = \min_a \underline{Q}_i^{\pi_j^*}(s, a), \tag{21}$$

$$\text{s.t. } \underline{Q}_j^{\pi_j^*}(s, a) \le \overline{\mathcal{U}}_j^{\pi_j^*}(s),$$

$$\underline{Q}_i^{\pi_i^*}(s, a) \le 2\overline{\mathcal{U}}_i^{\pi_i^*}(s) - \underline{\mathcal{U}}_i^{\pi_i^*}(s) + \beta_i, \quad i < j.$$

Note that the computation of bounds on the terms $$\mathcal{U}_i^{\pi_j^*}(s)$$

is not required for the tree search to run, but could be used for introspection purposes. Once the cost bounds for each hierarchy level are computed at a belief node, the cost values may be propagated through the tree using recursion via Equation (12). Finally, at the leaf nodes of the tree, the tree search may use heuristics to determine the upper and lower bound costs, and, for simplicity, the same heuristic may be used for each level of the hierarchical optimization (e.g., for upper bounds the tree search can set $$\overline{U}^{\pi_0^*} = \overline{U}^{\pi_1^*} = \dots = \overline{U}^{\pi_m^*}).$$

This hierarchical tree search also ensure that the total accumulated regret over all of the objective levels, i.e., the total amount that costs regressed at each level for the final candidate action to be chosen, will not exceed $$\frac{\beta_i}{1-\gamma}.$$

Specifically, the hierarchical tree search may guarantee that the total accumulated regret, $$\Delta_i^{\pi_j^*}(s)$$

when following policy $$\pi_j^*,$$

is constrained as follows:

$$\Delta_i^{\pi_j^*}(s) := \mathcal{U}_i^{\pi_j^*}(s) - \mathcal{U}_i^{\pi_i^*}(s) \le \frac{\beta_i}{1-\gamma}, \ \forall\, i < j \tag{22}$$

At operation 564, example process 500 may include updating the upper and lower bound costs at a prediction node of the deepest level, j, of the tree search reached so far, according to any of the techniques discussed herein. Operation 564 may additionally or alternatively include determining whether a last objective level, m, has been reached. If the last objective level has been reached, example process 500 may transition to operation 566. At operation 566, example process 500 may comprise controlling a vehicle based at least in part on last-determined candidate action of the tree search, which may be the candidate action selected at operation 562.

However, if the last objective has not been reached at operation 564, example process 500 may return to operations 546, 550, and 562 until the last level, m, has been reached and a candidate action has been selected for that m-th objective level. In such an example, the example process 500 may comprise the following operations, which provide a high-level summary of an example of operations 546, 550, and 562:

- For each of the leaf prediction nodes, use a heuristic to generate the upper and lower bounds for the optimal hierarchical policies.
- Perform the following operations recursively until the root node is reached:
  - For up to each prediction node, use the recursion determined by Equation 12 to compute the set of upper and lower bounds $$\{\overline{Q}^{\pi_1^*}, \dots, \overline{Q}^{\pi_m^*}\} \text{ and } \{\underline{Q}^{\pi_1^*}, \dots, \underline{Q}^{\pi_m^*}\}$$

for each action;

- For j=1, . . . , m, use Equation 8 or Equation 18 and Equation 9 or Equation 19 to compute the sets of actions $$\{\overline{a}_1^*, \dots \overline{a}_m^*\} \text{ and } \{\underline{a}_1^*, \dots, \underline{a}_m^*\};$$

and

Compute bounds $$\left\{\overline{U}^{\pi_1^*}, \ldots, \overline{U}^{\pi_m^*}\right\} \text{ and } \left\{\underline{U}^{\pi_1^*}, \ldots, \underline{U}^{\pi_m^*}\right\}$$

for the current prediction node.

Figure 6B:
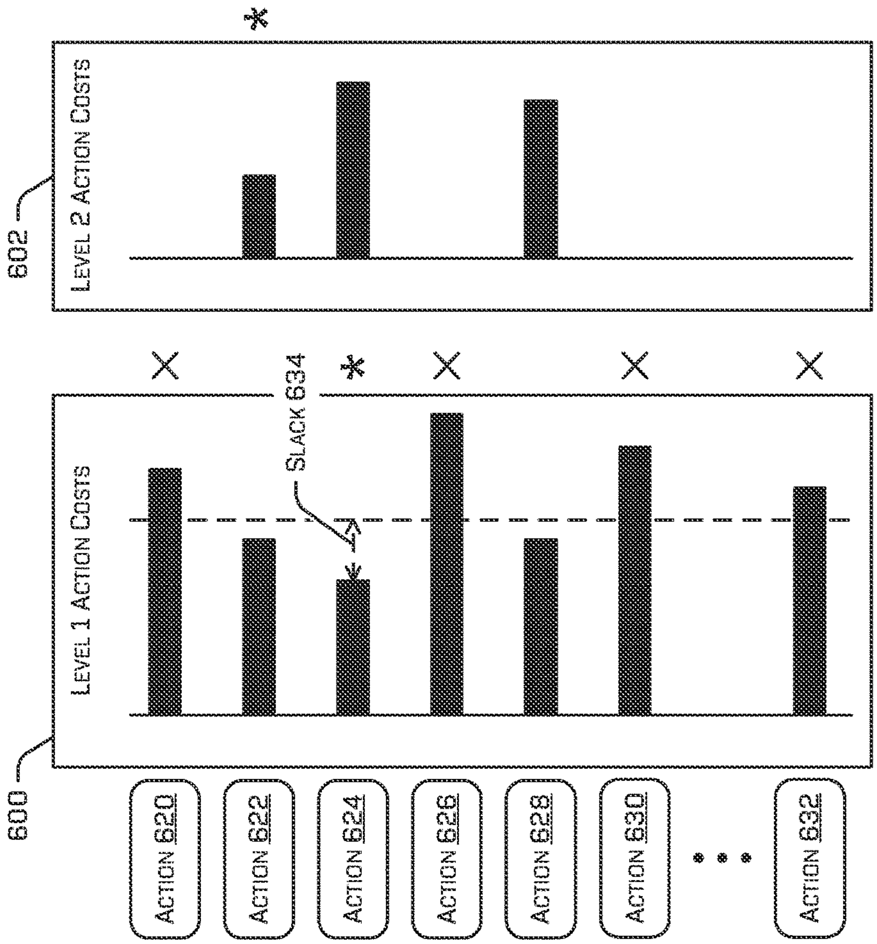
FIGS. 6A and 6B illustrate two levels of hierarchical tree search cost operations to determine a trajectory for controlling a vehicle from among multiple candidate trajectories.
Figure 6A:
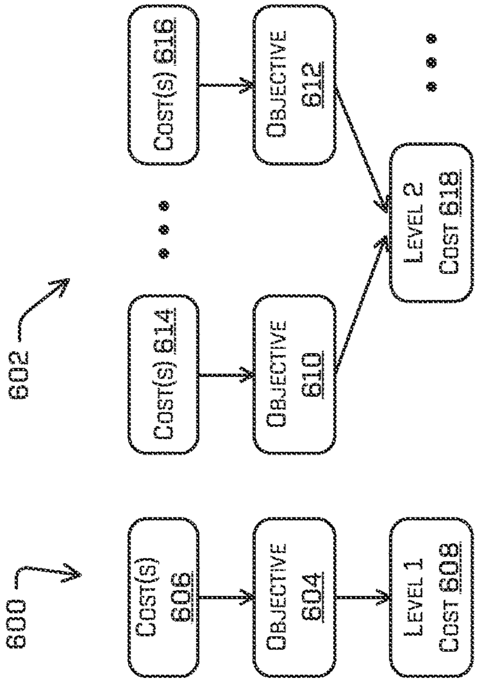

Example Hierarchical Tree Search Objective Levels and Example Selected Candidate Actions FIGS. 6A and 6B illustrate two levels of hierarchical tree search cost operations to determine a trajectory for controlling a vehicle from among multiple candidate trajectories. FIG. 6A depicts a first objective level 600 of the tree search and a second objective level 602 of the tree search. The first objective level 600 is an example of an objective level that has a single objective, objective 604, associated therewith. In some examples, the objective 604 may have a cost function associated therewith that uses cost(s) 606 as input. To give an example, the objective 604 may be impact avoidance and the cost(s) 606 may be based at least in part a minimum distance between the vehicle and a nearest object, an acceleration required to avoid impact, a time until impact, a predicted likelihood of impact, and/or the like that would result from a particular candidate action. The cost function may use these different factors to determine sub-costs, which in a linear scalarization, may be weighted by a set of whets to determine the level 1 cost 608 associated with the candidate action.

The second objective level 602 is an example of an objective level that has multiple objectives associated therewith, i.e., objective 610 and objective 612. A first cost function associated with the first objective 610 may use cost(s) 614 to determine a first sub-cost that may be summed with a second sub-cost determined by a second cost function associated with objective 612 based at least in part on cost(s) 616. For example, objective 610 and/or 616 may include safety, if safety wasn't included in the first level, progress, driving metrics, comfort, and/or the like. These are just given as examples and the composition of the objectives and the ordering thereof may occur in multiple arrangements from most to least important.

FIG. 6B depicts the filtering that may functionally result from use of a slack amount or adaptive slack amount, as discussed herein. For the sake of simplicity, the discussion of costs in FIG. 6B only considers the upper bound costs associated with candidate actions 620-632. These costs are depicted as filled in bars where increasing cost and size of the bar indicate decreasing conformity to the objective of the current level. At the first level, candidate action 624 is determined to have a minimum first level cost associated therewith, as indicated by the asterisk to the right of the cost associated with candidate action 624. FIG. 6B also depicts a slack amount 634 associated with the first level. Any candidate action having a first level cost that exceeds the cost of candidate action 624 plus the slack amount is identified as being unfeasible with an "x" and may be excluded from a subset of candidate actions at the second objective level 602.

At the second objective level 602, candidate action 622 may be determined for use since candidate action 622 is associated with a minimum first level cost and has a first level cost associated therewith that meets the slack constraint defined by the first level cost of candidate action 624 plus the slack amount.

EXAMPLE CLAUSES

A. A system comprising: one or more processors; and non-transitory memory storing processor-executable instructions that, when executed by the one or more processors, cause the system to perform operations comprising: receiving sensor data from a sensor; determining, based at least in part on the sensor data, a first candidate action and a second candidate action for controlling motion of a vehicle; generating a tree comprising a first action node associated with the first candidate action and a second action node associated with the second candidate action; determining, based at least in part on the first candidate action and a first cost function associated with a first level objective for controlling the vehicle, a first lower bound cost and a first upper bound cost associated with the first level objective; determining, based at least in part on the first upper bound cost, a first subset of the tree associated with upper bound costs determined based at least in part on the first cost function that are not greater than the first upper bound cost by more than a threshold amount; determining a second subset of the tree based at least in part on a second upper bound cost determined by a second cost function associated with a second level objective, wherein the second subset is a subset of the first subset and wherein the second upper bound cost is determined for the first candidate action or the second candidate action; determining a trajectory based at least in part on the second subset of the tree; and controlling the vehicle based at least in part on the trajectory.

B. The system of paragraph A, wherein: the first candidate action and the second candidate action are two candidate actions from among a plurality of candidate actions associated with different nodes of the tree; and determining the first subset of the tree comprises determining a subset of candidate actions that are associated with upper bound costs that are more than the first upper bound cost by no more than the threshold amount.

C. The system of either paragraph A or B, wherein: the first level objective comprises at least one of an impact avoidance objective or a safety objective; and the second level objective comprises at least one of a safety objective, progress objective, a passenger comfort objective, or a driving performance objective.

D. The system of any one of claims A-C, wherein: the operations further comprise determining a predicted state estimated to result from controlling the vehicle using the first candidate action; and determining the first lower bound cost and the first upper bound cost is based at least in part on the predicted state.

E. The system of any one of claims A-D, wherein: the threshold amount is a first threshold amount associated with the first level objective; and the second level objective is associated with a second threshold amount different from the first threshold amount.

F. The system of any one of claims A-E, wherein the first upper bound cost is a lowest upper bound cost from among multiple upper bound costs determined by the first cost function.

G. A method comprising: determining, for a first candidate action for controlling a vehicle, a first lower bound cost and a first upper bound cost associated with a first level objective; generating a tree comprising a first action node associated with the first candidate action and a second action node associated with a second candidate action; determining a second lower bound cost and a second upper bound cost associated with a second level objective; determining to use the first candidate action based at least in part on: determining that the second upper bound cost is less than a third upper bound cost associated with the second candidate action and determined for the second level objective; and determining that a difference between the first upper bound cost and a fourth upper bound cost associated with the second candidate action and determined for the first level objective is not greater than a threshold amount associated with the first level objective; and controlling the vehicle based at least in part on the first candidate action.

H. The method of paragraph G, further comprising, determining a subset of action nodes of the tree associated with upper bound costs determined for the first level objective, wherein determining the subset comprises determining that the upper bounds associated therewith are not greater than the fourth upper bound cost by more than the threshold amount form the first upper bound cost, wherein the fourth upper bound cost is the lowest upper bound cost associated with the first level objective.

I. The method of paragraph H, wherein: the first candidate action and the second candidate action are two candidate actions from among a plurality of candidate actions associated with different nodes of the tree; and determining the first subset of the tree comprises determining a subset of candidate actions that are associated with upper bound costs that are more than the fourth upper bound cost by no more than the threshold amount.

J. The method of any one of claims G-I, wherein: the first level objective comprises at least one of an impact avoidance objective or a safety objective; and the second level objective comprises at least one of a safety objective, progress objective, a passenger comfort objective, or a driving performance objective.

K. The method of any one of claims G-J, wherein: the threshold amount is a first threshold amount associated with the first level objective; and the second level objective is associated with a second threshold amount different from the first threshold amount.

L. The method of any one of claims G-K, wherein: the first upper bound cost is a lowest upper bound cost from among multiple upper bound costs determined by the first cost function; and the threshold amount is a first threshold amount and a second threshold amount is associated with the second objective level.

M. The method of any one of claims G-L, wherein determining the first upper bound cost is based at least in part on a transition cost associated with taking the first candidate action from a first state to a second state, a risk transition mapping, and the estimated total upper bound cost estimate of reaching the second state from a beginning state associated with a root node of a tree search.

N. One or more non-transitory computer-readable media storing processor-executable instructions that, when executed by one or more processors, cause the one or more processors to perform operations comprising: determining, for a first candidate action associated with controlling a vehicle, a first lower bound cost and a first upper bound cost associated with a first level objective for controlling the vehicle; determining, based at least in part on a threshold amount and at least one of the first lower bound cost or the first upper bound cost, a subset of a plurality of candidate actions comprising the first candidate action; determining, based at least in part on the first candidate action or a second candidate action of the subset, a second lower bound cost and a second upper bound cost associated with a second level objective for controlling the vehicle, wherein the second candidate action is part of the subset of the plurality of candidate actions and is associated with a third upper bound cost determined for the first level objective and that is greater than the first upper bound cost by less than the threshold amount; and controlling the vehicle based at least in part on the based at least in part on the second upper bound cost.

O. The one or more non-transitory computer-readable media of paragraph N, wherein determining the subset of the plurality of candidate actions comprises determining that lower bound costs or upper bound costs associated with the subset do not exceed the first upper bound cost by more than the threshold amount.

P. The one or more non-transitory computer-readable media of either paragraph N or O, wherein the operations further comprise updating a prediction node of a tree search, wherein the prediction node indicates a vehicle state that may result in executing the first candidate action or the second candidate action.

Q. The one or more non-transitory computer-readable media of paragraph P, wherein updating the prediction node is based at least in part on the first upper bound cost, the second upper bound cost, and one or more costs associated with a node that exist between the prediction node and a root node of the tree search.

R. The one or more non-transitory computer-readable media of either paragraph P or Q, wherein the operations further comprise: storing the first lower bound cost and the first upper bound cost in association with the prediction node; and storing the second lower bound cost and the second upper bound cost in association with the prediction node, wherein the first candidate action is associated with a first action node of a tree search, the second candidate action is associated with a second action node of the tree search, and the prediction node is associated with the tree search.

S. The one or more non-transitory computer-readable media of any one of claims N-R, wherein determining the first upper bound cost is based at least in part on a transition cost associated with taking the first candidate action from a first state to a second state, a risk transition mapping, and the estimated total upper bound cost estimate of reaching the second state from a beginning state associated with a root node of a tree search.

T. The one or more non-transitory computer-readable media of paragraph S, wherein the transition cost is based at least in part on one or more sub-costs associated with the first level objective.

U. A system comprising: one or more processors; and non-transitory memory storing processor-executable instructions that, when executed by the one or more processors, cause the system to perform the method recited in any one of claims G-M.

V. One or more non-transitory computer-readable media comprising storing processor-executable instructions that, when executed by the one or more processors, cause the one or more processors to perform the method recited in any one of claims G-M.

W. An autonomous vehicle comprising: one or more processors; and non-transitory memory storing processor-executable instructions that, when executed by the one or more processors, cause the system to perform the method recited in any one of claims G-M.

While the example clauses described above are described with respect to one particular implementation, it should be understood that, in the context of this document, the content of the example clauses can also be implemented via a method, device, system, computer-readable medium, and/or another implementation. Additionally, any of examples A-W may be implemented alone or in combination with any other one or more of the examples A-W.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and non-transitory memory storing processor-executable instructions that, when executed by the one or more processors, cause the system to perform operations comprising:

receiving sensor data from a sensor;

determining, based at least in part on the sensor data, a first candidate action and a second candidate action for controlling motion of a vehicle;

generating a tree comprising a first action node associated with the first candidate action and a second action node associated with the second candidate action;

determining, based at least in part on the first candidate action and a first cost function associated with a first level objective for controlling the vehicle, a first lower bound cost and a first upper bound cost associated with the first level objective;

determining, based at least in part on the first upper bound cost, a first subset of the tree associated with upper bound costs that are determined based at least in part on the first cost function and are not greater than the first upper bound cost by more than a threshold amount;

determining a second subset of the tree based at least in part on a second upper bound cost determined by a second cost function associated with a second level objective, wherein the second subset is a subset of the first subset and wherein the second upper bound cost is determined for the first candidate action or the second candidate action, and wherein the first level objective is associated with at least a first level of the tree, the second level objective is associated with at least a second level of the tree, the second level objective is different from the first level objective, and a priority of the second level objective is lower than a priority of the first level objective;

determining a trajectory based at least in part on the second subset of the tree; and controlling the vehicle based at least in part on the trajectory.

2. The system of claim 1, wherein:

the first candidate action and the second candidate action are two candidate actions from among a plurality of candidate actions associated with different nodes of the tree; and determining the first subset of the tree comprises determining a subset of candidate actions that are associated with second upper bound costs that are more than the first upper bound cost by no more than the threshold amount.

3. The system of claim 1, wherein:

the first level objective comprises at least one of an impact avoidance objective or a safety objective; and the second level objective comprises at least one of the safety objective, a progress objective, a passenger comfort objective, or a driving performance objective.

4. The system of claim 1, wherein:

the operations further comprise determining a predicted state estimated to result from controlling the vehicle using the first candidate action; and determining the first lower bound cost and the first upper bound cost is based at least in part on the predicted state.

5. The system of claim 1, wherein:

the threshold amount is a first threshold amount associated with the first level objective; and the second level objective is associated with a second threshold amount different from the first threshold amount.

6. The system of claim 1, wherein the first upper bound cost is a lowest upper bound cost from among multiple upper bound costs determined by the first cost function.

7. A method comprising:

determining, for a first candidate action for controlling a vehicle, a first lower bound cost and a first upper bound cost associated with a first level objective;

generating a tree comprising a first action node associated with the first candidate action and a second action node associated with a second candidate action, wherein the tree comprises a plurality of hierarchical levels associated with a plurality of objectives of different priorities;

determining a second lower bound cost and a second upper bound cost associated with a second level objective, wherein the first level objective is associated with at least a first level of the tree, the second level objective is associated with at least a second level of the tree, and the second level objective is different from the first level objective;

determining to use the first candidate action based at least in part on:

determining that the second upper bound cost associated with the second level objective is less than a third upper bound cost associated with the second candidate action and determined for the second level objective; and determining that a difference between the first upper bound cost associated with the first level objective and a fourth upper bound cost associated with the second candidate action and determined for the first level objective is not greater than a threshold amount associated with the first level objective; and controlling the vehicle based at least in part on the first candidate action.

8. The method of claim 7, further comprising: determining a subset of action nodes of the tree associated with upper bound costs determined for the first level objective, wherein determining the subset comprises determining that the upper bound costs associated therewith are not greater than the fourth upper bound cost by more than the threshold amount from the first upper bound cost, wherein the fourth upper bound cost is a lowest upper bound cost associated with the first level objective.

9. The method of claim 8, wherein:

the first candidate action and the second candidate action are two candidate actions from among a plurality of candidate actions associated with different nodes of the tree; and determining the subset comprises determining a subset of candidate actions that are associated with second upper bound costs that are more than the fourth upper bound cost by no more than the threshold amount.

10. The method of claim 7, wherein:

the first level objective comprises at least one of an impact avoidance objective or a safety objective; and the second level objective comprises at least one of the safety objective, a progress objective, a passenger comfort objective, or a driving performance objective.

11. The method of claim 7, wherein:

the threshold amount is a first threshold amount associated with the first level objective; and the second level objective is associated with a second threshold amount different from the first threshold amount.

12. The method of claim 7, wherein:

the first upper bound cost is a lowest upper bound cost from among multiple upper bound costs determined by a first cost function; and the threshold amount is a first threshold amount and a second threshold amount is associated with the second level objective.

13. The method of claim 7, wherein determining the first upper bound cost is based at least in part on a transition cost associated with taking the first candidate action from a first state to a second state, a risk transition mapping, and an estimate of a total upper bound cost of reaching the second state from a beginning state associated with a root node of a tree search.

14. One or more non-transitory computer-readable media storing processor-executable instructions that, when executed by one or more processors, cause the one or more processors to perform operations comprising:

determining, for a first candidate action associated with controlling a vehicle, a first lower bound cost and a first upper bound cost associated with a first level objective for controlling the vehicle;

determining, based at least in part on a threshold amount and at least one of the first lower bound cost or the first upper bound cost, a subset of a plurality of candidate actions comprising the first candidate action;

determining, based at least in part on the first candidate action or a second candidate action of the subset of the plurality of candidate actions, a second lower bound cost and a second upper bound cost associated with a second level objective for controlling the vehicle, wherein the second candidate action is part of the subset of the plurality of candidate actions and is associated with a third upper bound cost determined for the first level objective and that is greater than the first upper bound cost by less than the threshold amount, and wherein the first level objective is associated with at least a first level of a tree, the second level objective is associated with at least a second level of the tree, and a priority of the second level objective is different from a priority of the first level objective; and controlling the vehicle based at least in part on the second upper bound cost.

15. The one or more non-transitory computer-readable media of claim 14, wherein determining the subset of the plurality of candidate actions comprises determining that lower bound costs or upper bound costs associated with the subset of the plurality of candidate actions do not exceed the first upper bound cost by more than the threshold amount.

16. The one or more non-transitory computer-readable media of claim 14, wherein the operations further comprise updating a prediction node of a tree search, and the prediction node indicates a vehicle state that results in executing the first candidate action or the second candidate action.

17. The one or more non-transitory computer-readable media of claim 16, wherein updating the prediction node is based at least in part on the first upper bound cost, the second upper bound cost, and one or more costs associated with a node that exists between the prediction node and a root node of the tree search.

18. The one or more non-transitory computer-readable media of claim 16, wherein the operations further comprise:

storing the first lower bound cost and the first upper bound cost in association with the prediction node; and storing the second lower bound cost and the second upper bound cost in association with the prediction node, wherein the first candidate action is associated with a first action node of the tree search, the second candidate action is associated with a second action node of the tree search, and the prediction node is associated with the tree search.

19. The one or more non-transitory computer-readable media of claim 14, wherein determining the first upper bound cost is based at least in part on a transition cost associated with taking the first candidate action from a first state to a second state, a risk transition mapping, and an estimate of a total upper bound cost of reaching the second state from a beginning state associated with a root node of a tree search.

20. The one or more non-transitory computer-readable media of claim 19, wherein the transition cost is based at least in part on one or more sub-costs associated with the first level objective.

* * * * *